(12) United States Patent
Kong

(10) Patent No.: US 10,768,441 B2
(45) Date of Patent: Sep. 8, 2020

(54) FOLDABLE VIRTUAL REALITY VIEWER STRUCTURE INTEGRATED IN MAILER AND/OR PRODUCT PACKAGING

(71) Applicant: Ginger W. Kong, South San Francisco, CA (US)

(72) Inventor: Ginger W. Kong, South San Francisco, CA (US)

( * ) Notice: Subject to any disclaimer, the term of this patent is extended or adjusted under 35 U.S.C. 154(b) by 143 days.

(21) Appl. No.: 16/004,134

(22) Filed: Jun. 8, 2018

(65) Prior Publication Data

US 2018/0292666 A1 Oct. 11, 2018

Related U.S. Application Data

(63) Continuation-in-part of application No. 15/160,539, filed on May 20, 2016, now Pat. No. 10,120,199.
(Continued)

(51) Int. Cl.
| | | |
|---|---|---|
| *G02B 30/37* | (2020.01) | |
| *G02B 27/01* | (2006.01) | |
| *G06F 3/0346* | (2013.01) | |
| *G06F 3/01* | (2006.01) | |
| *G06F 1/16* | (2006.01) | |

(Continued)

(52) U.S. Cl.
CPC ......... *G02B 30/37* (2020.01); *G02B 27/0176* (2013.01); *G02B 27/04* (2013.01); *G06F 1/163* (2013.01); *G06F 3/011* (2013.01); *G06F 3/0346* (2013.01); *G02B 7/021* (2013.01); *G02B 27/028* (2013.01); *G02B 2027/0134* (2013.01); *H04M 1/026* (2013.01)

(58) Field of Classification Search
CPC ............... G02B 27/22; G02B 27/0172; G02B 2027/0134; G02B 21/22; G02B 27/2257; G02B 27/2221; G02B 21/368; G02B 5/285; G02B 1/11; G02B 5/282; G02B 1/111; G02B 1/113; G02B 5/208; G02B 5/281; G02B 5/0891; G02B 5/20; G02B 5/3041; G02B 5/305; G06F 3/0346; H04M 1/026
USPC ............... 359/474, 477, 466, 577, 580, 582, 359/584–587, 589, 590
See application file for complete search history.

(56) References Cited

U.S. PATENT DOCUMENTS

| | | |
|---|---|---|
| 4,973,087 A | 5/1990 | Balogh |
| 6,069,735 A | 5/2000 | Murphy |

(Continued)

*Primary Examiner* — Jade R Chwasz
(74) *Attorney, Agent, or Firm* — Michael L. Greenberg, Esq.; Greenberg & Lieberman, LLC

(57) ABSTRACT

A new method of constructing a convertible virtual reality viewer on planar surface when in an unfolded state, or out of a box-type structure is described. Through its design of structural folds, the planar surface(s) can be configured into any shape such as, but not limited to, a package, box, container, mailer, and flyer of any material. Users of such a viewer download a software application onto a smart device and use this display apparatus to view a virtual image through a face plate, containing a pair of biconvex lenses. A viewer fashioned as such provides an environmental solution to reusing resources and limiting product waste by reusing product packaging as a virtual reality viewer with multiple uses. The planar surface(s) are intended for use as product packaging and/or mailer designed to be converted into a virtual reality viewer by the user.

10 Claims, 41 Drawing Sheets

Related U.S. Application Data which is a continuation of application No. 15/131,015, filed on Apr. 17, 2016, now abandoned.

(60) Provisional application No. 62/103,096, filed on Jan. 14, 2015.

(51) Int. Cl.
*G02B 27/04* (2006.01)
*H04M 1/02* (2006.01)
*G02B 7/02* (2006.01)
*G02B 27/02* (2006.01)

(56) References Cited

U.S. PATENT DOCUMENTS

| | | | |
|---|---|---|---|
| D701,206 S | 3/2014 | Luckey et al. | |
| 9,131,757 B2 | 9/2015 | Tseng | |
| 9,405,126 B1* | 8/2016 | Margolin | G02B 27/2257 |
| 2012/0104742 A1* | 5/2012 | Scrymgeour | A63F 3/065 |
| | | | 283/85 |
| 2014/0009828 A1* | 1/2014 | Plotkin | G02B 27/2257 |
| | | | 359/474 |

* cited by examiner

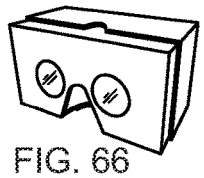
FIG. 66
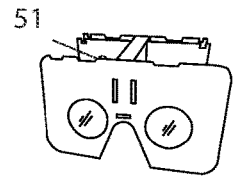
FIG. 3A
VIEWER HOUSING SYSTEM
FACE PLATE OF VIEWER TO HOLD LENSES IN PLACE
1 ↘ 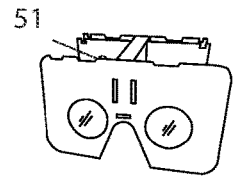
LENSES ATTACHED DIRECTLY TO FACE PLATE
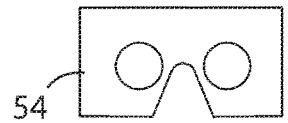
54
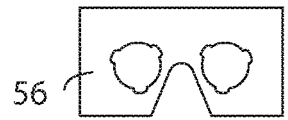
56
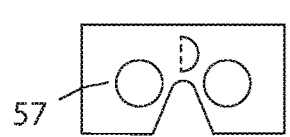
57
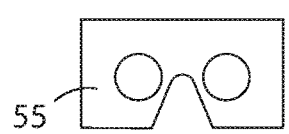
55
PANEL 54 WITH LENSES ATTACHED DIRECTLY TO BACK OF FACE PLATE
OR
LENSES SECURED BETWEEN PANELS 55-57 AND THEN ATTACHED TO BACK OF FACE PLATE
SPINE OF VIEWER TO GUIDE AND CENTER DEVICE AND CAN BE STRUCTURAL FRAME
2 ↘ 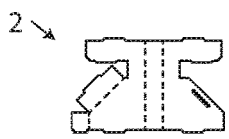
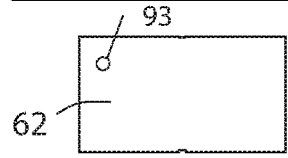
62 / 93
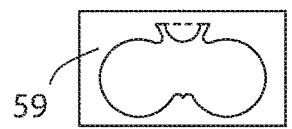
59
BACK PLATE OF VIEWER TO STABILIZE DEVICE IN USE
3 ↘ 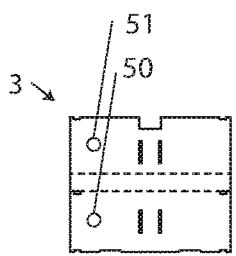
51
50
FIG. 2
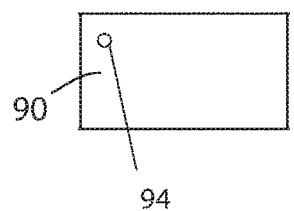
90 / 94

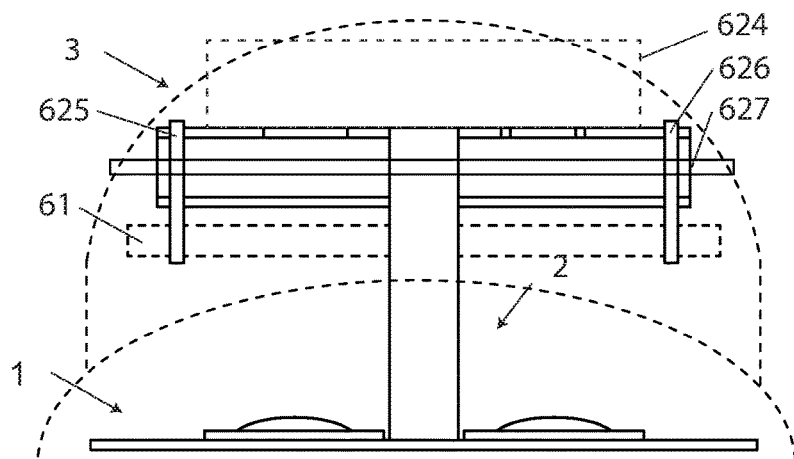
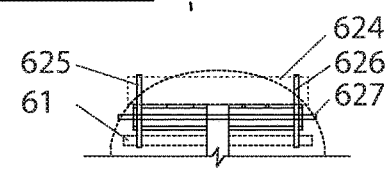
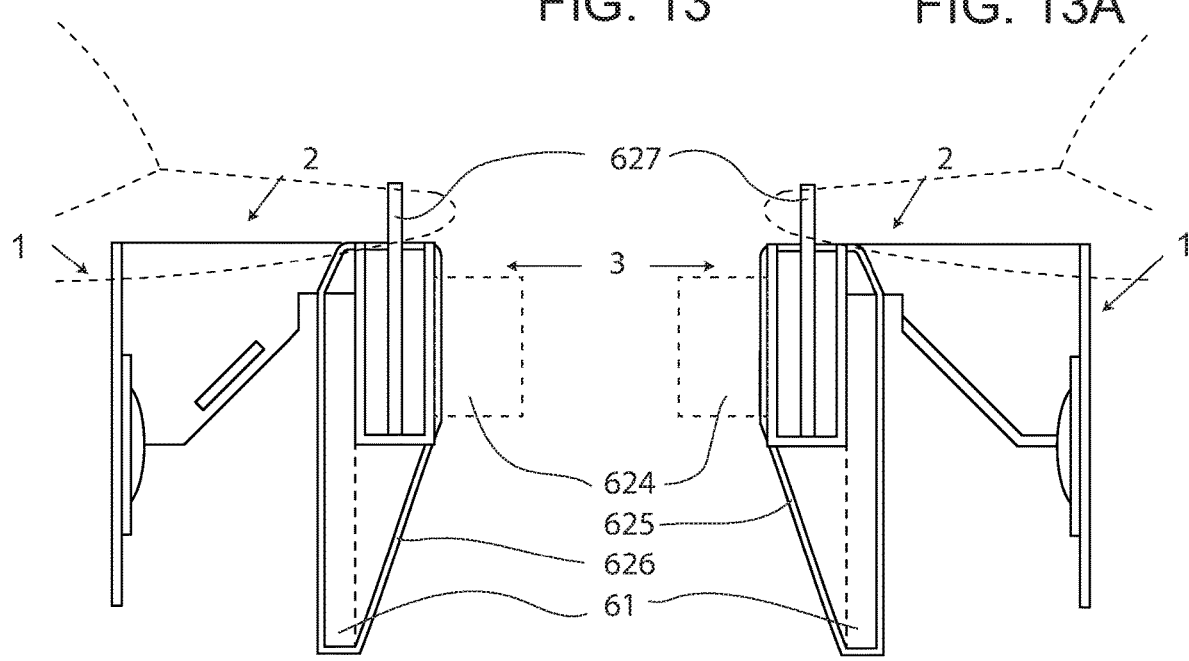
FIG. 13      FIG. 13A
FIG. 14      FIG. 15

LINETYPE KEY
PERFORATION ........
CREASE – – – – –
CUT ———

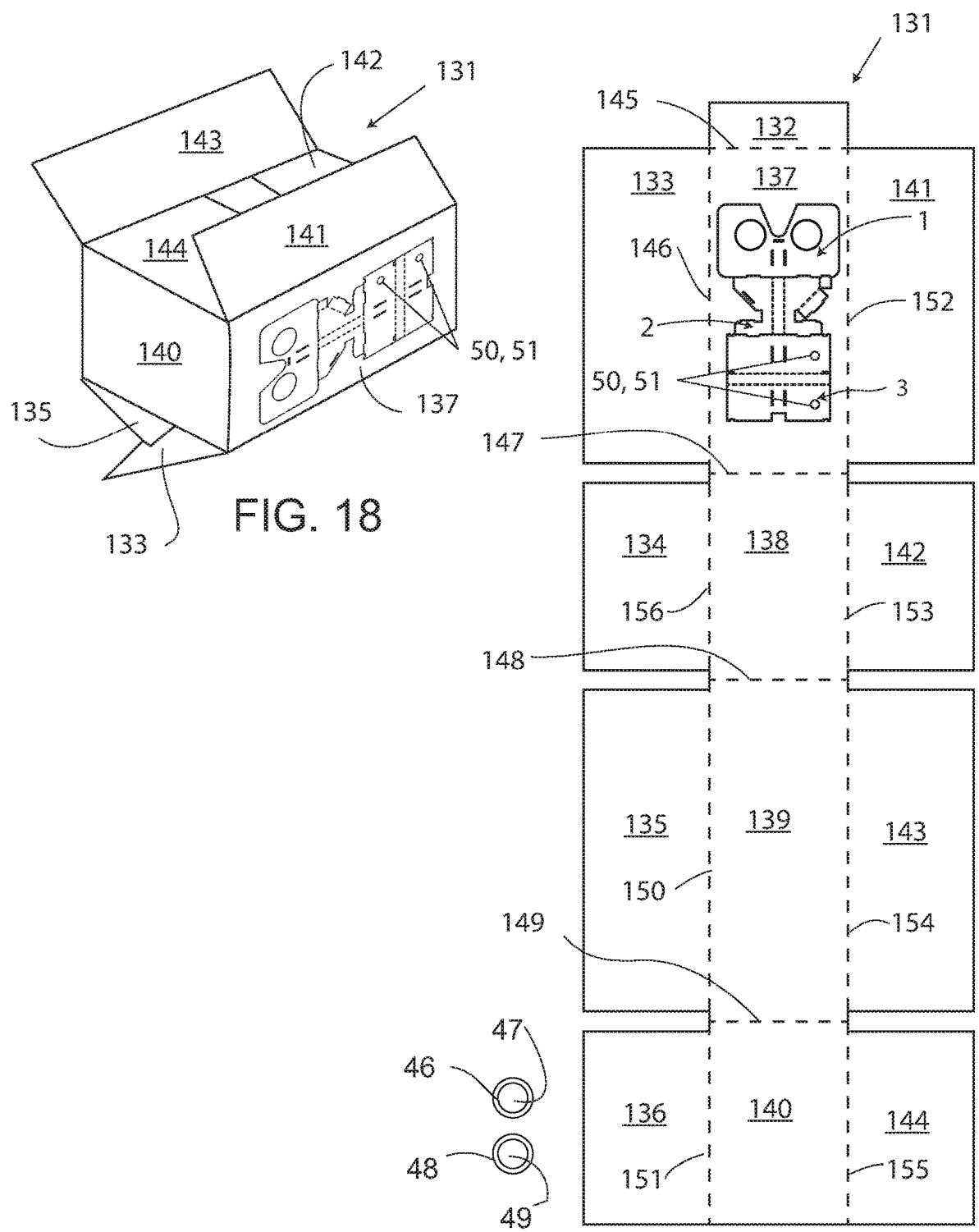

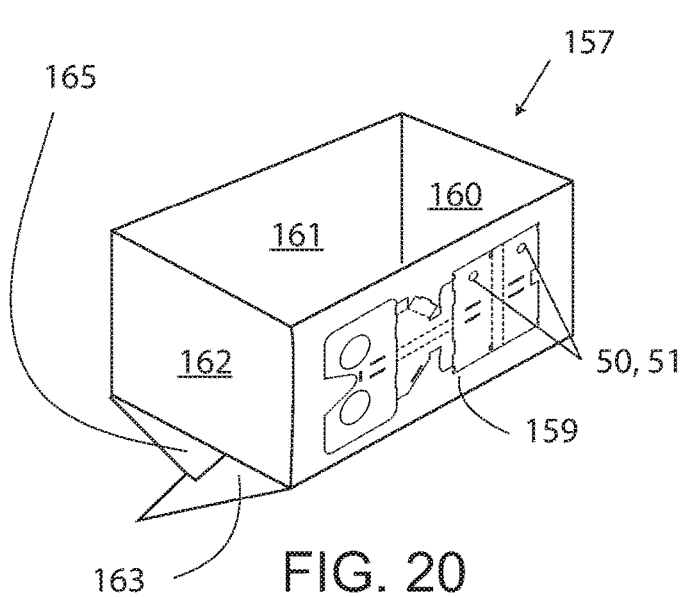
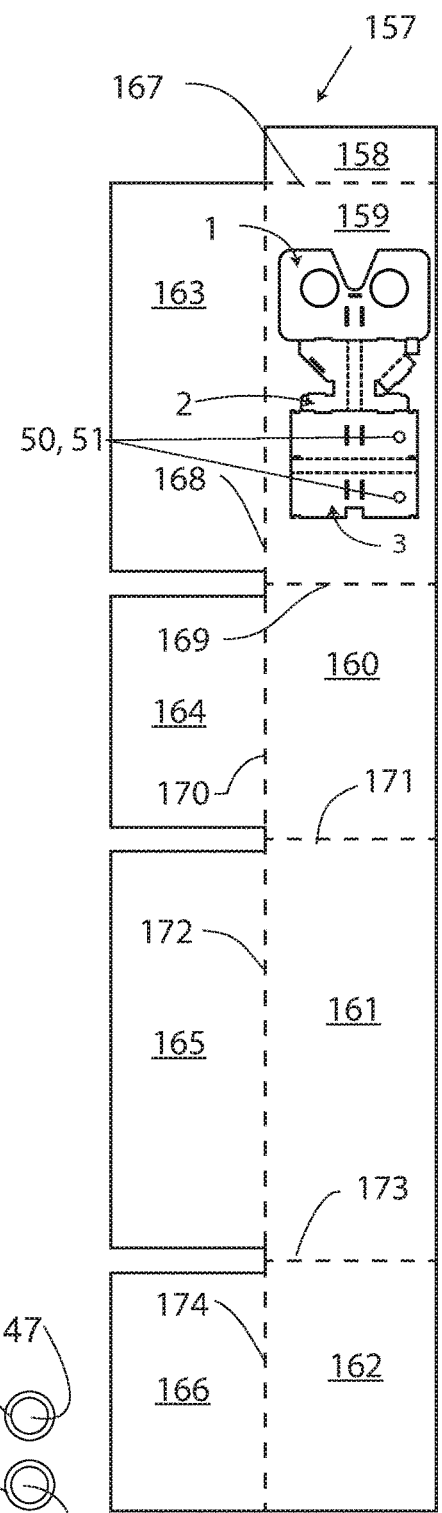

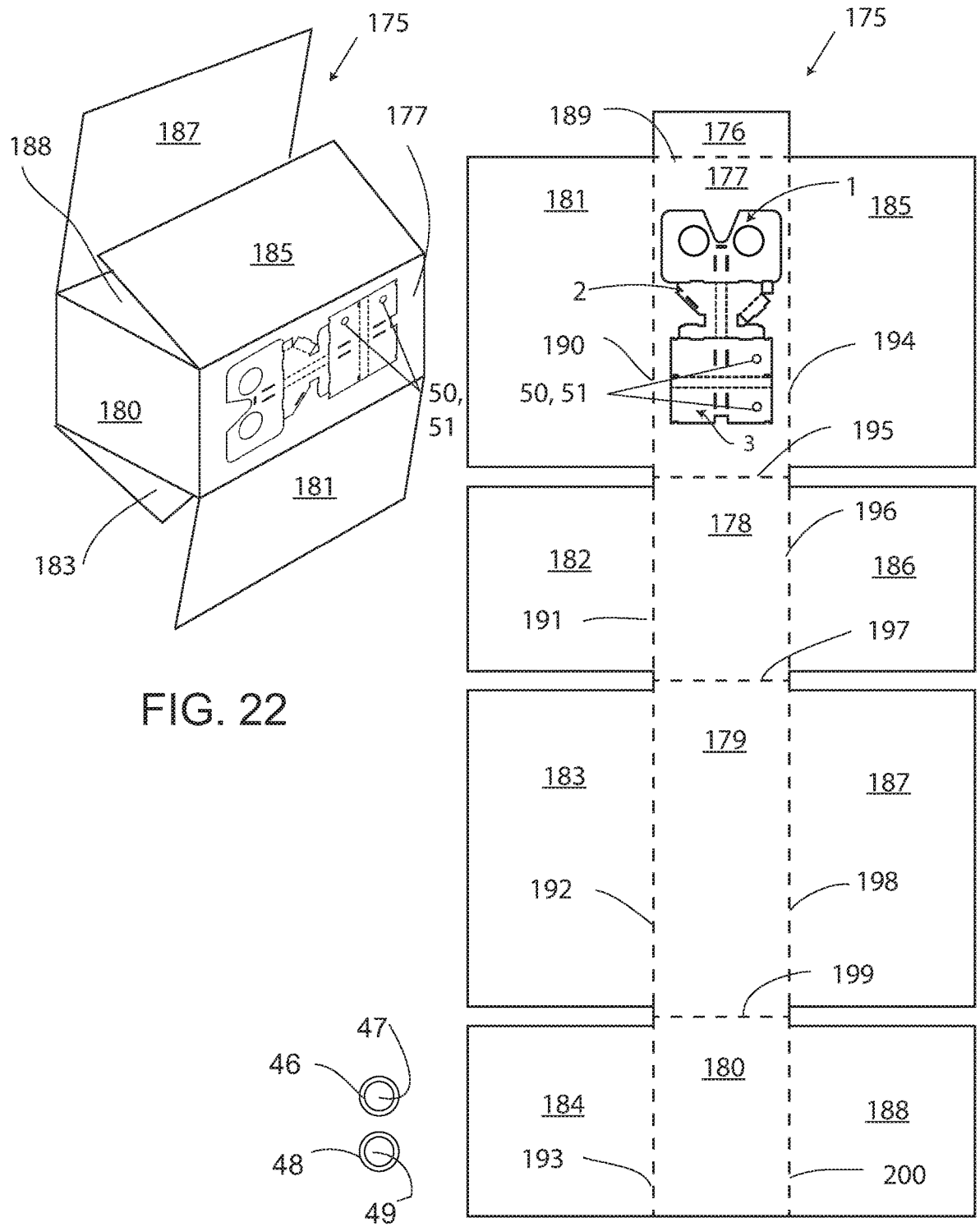

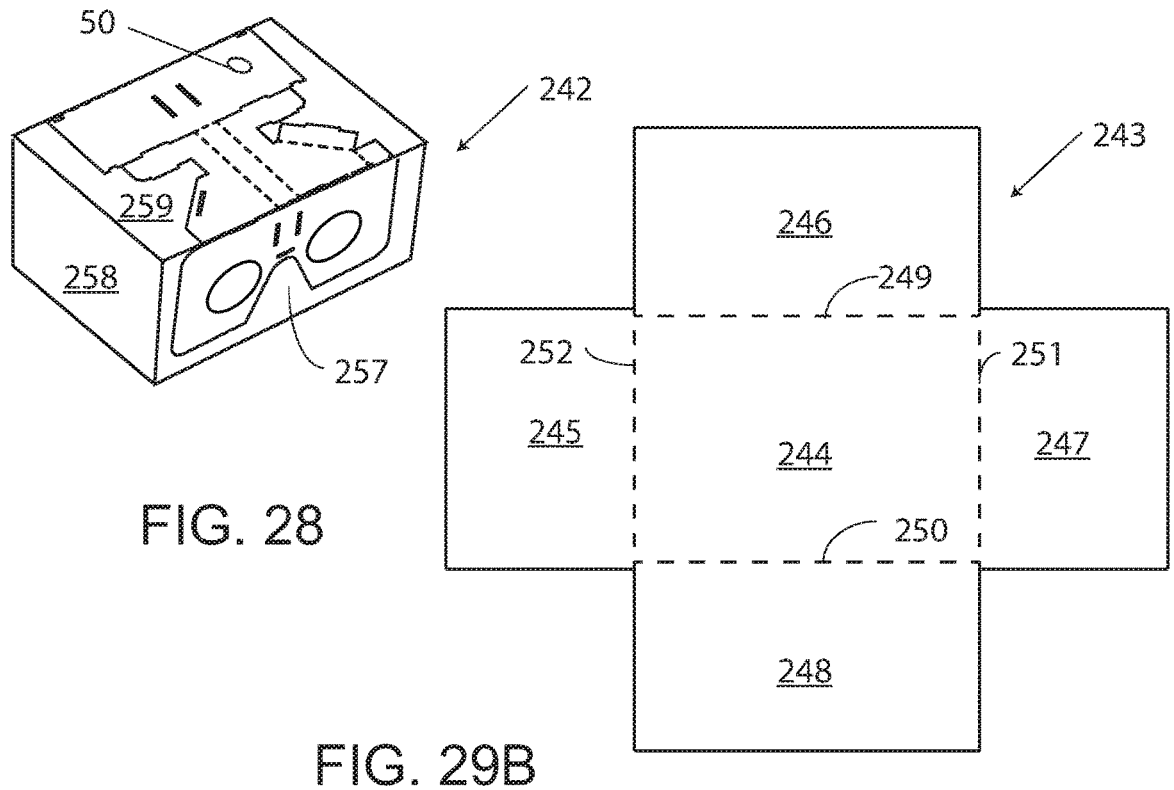
FIG. 28
FIG. 29B
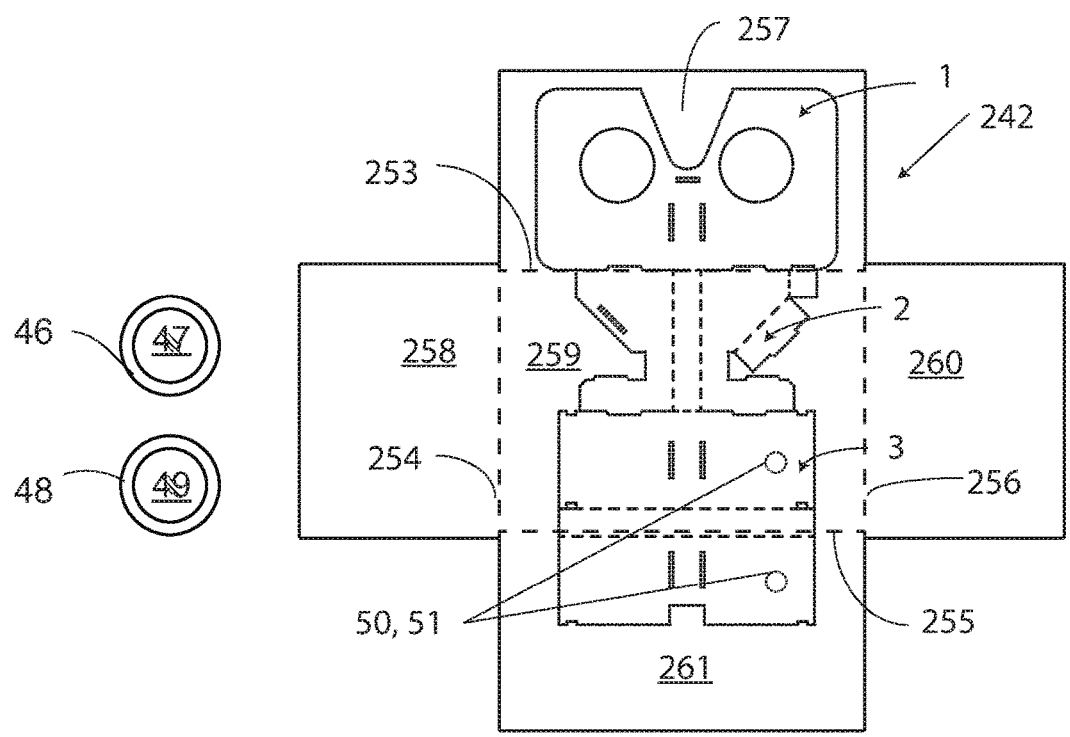
FIG. 29A

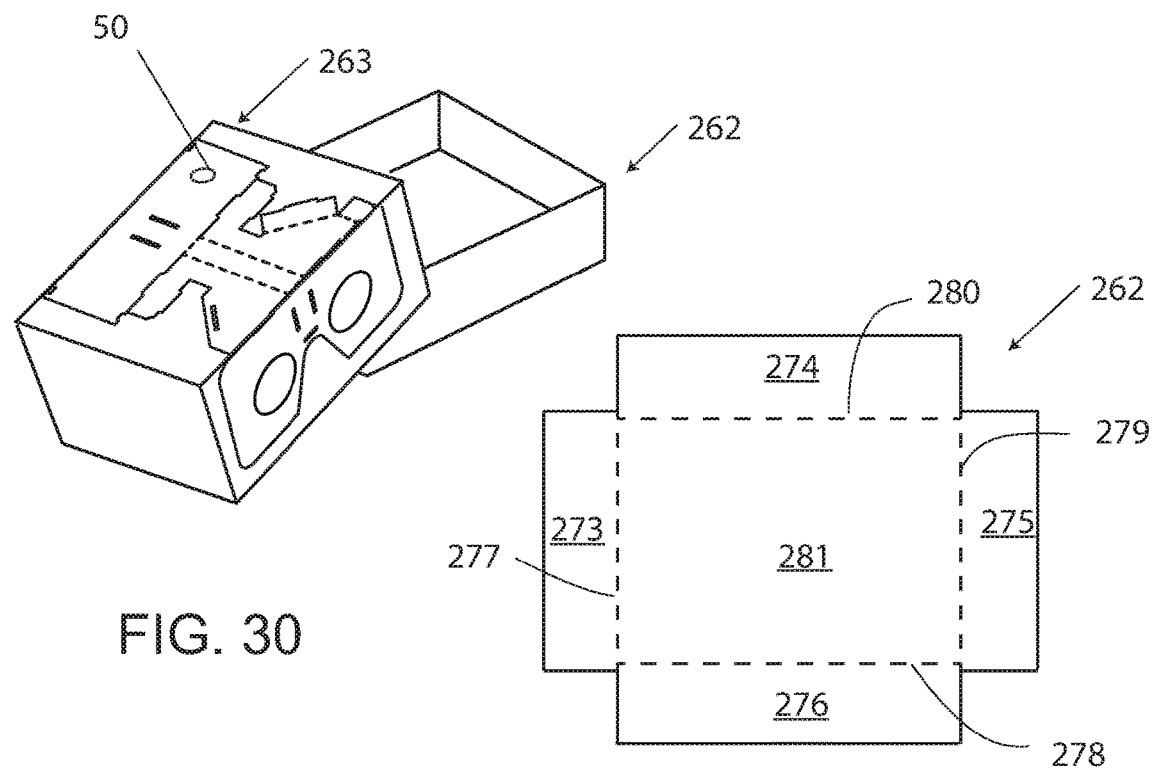
FIG. 30
FIG. 31
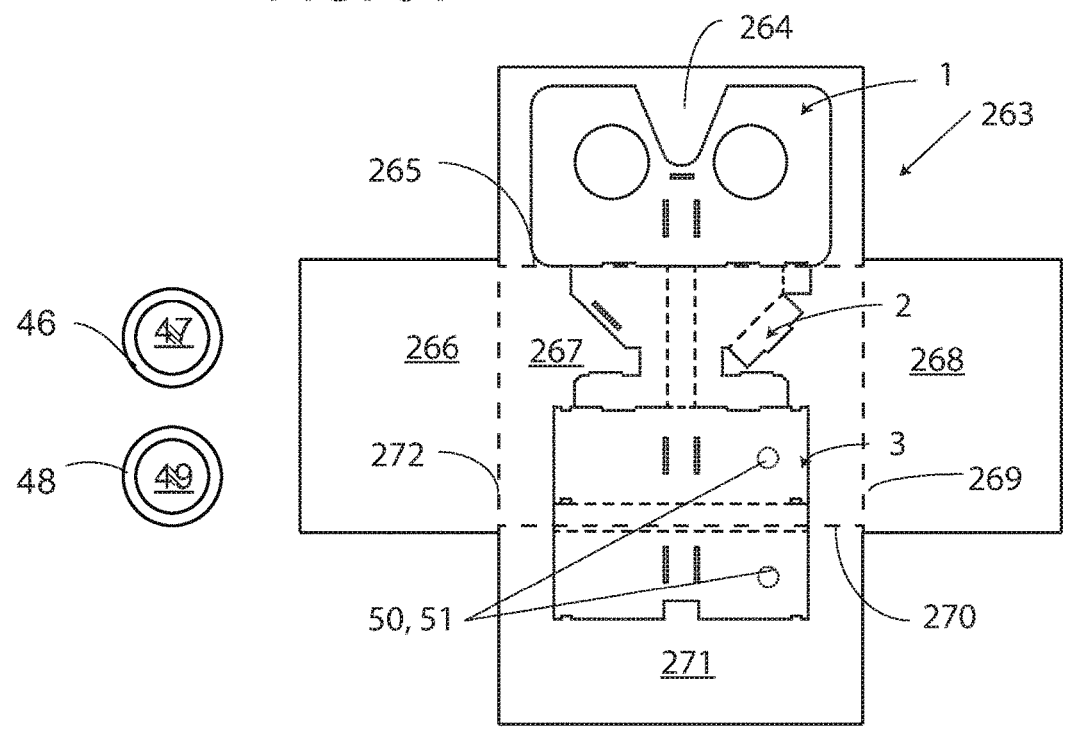
FIG. 32

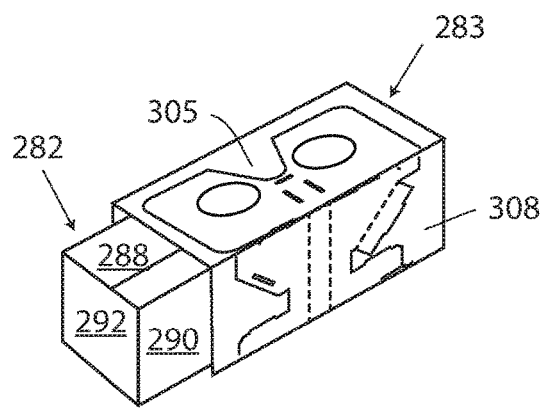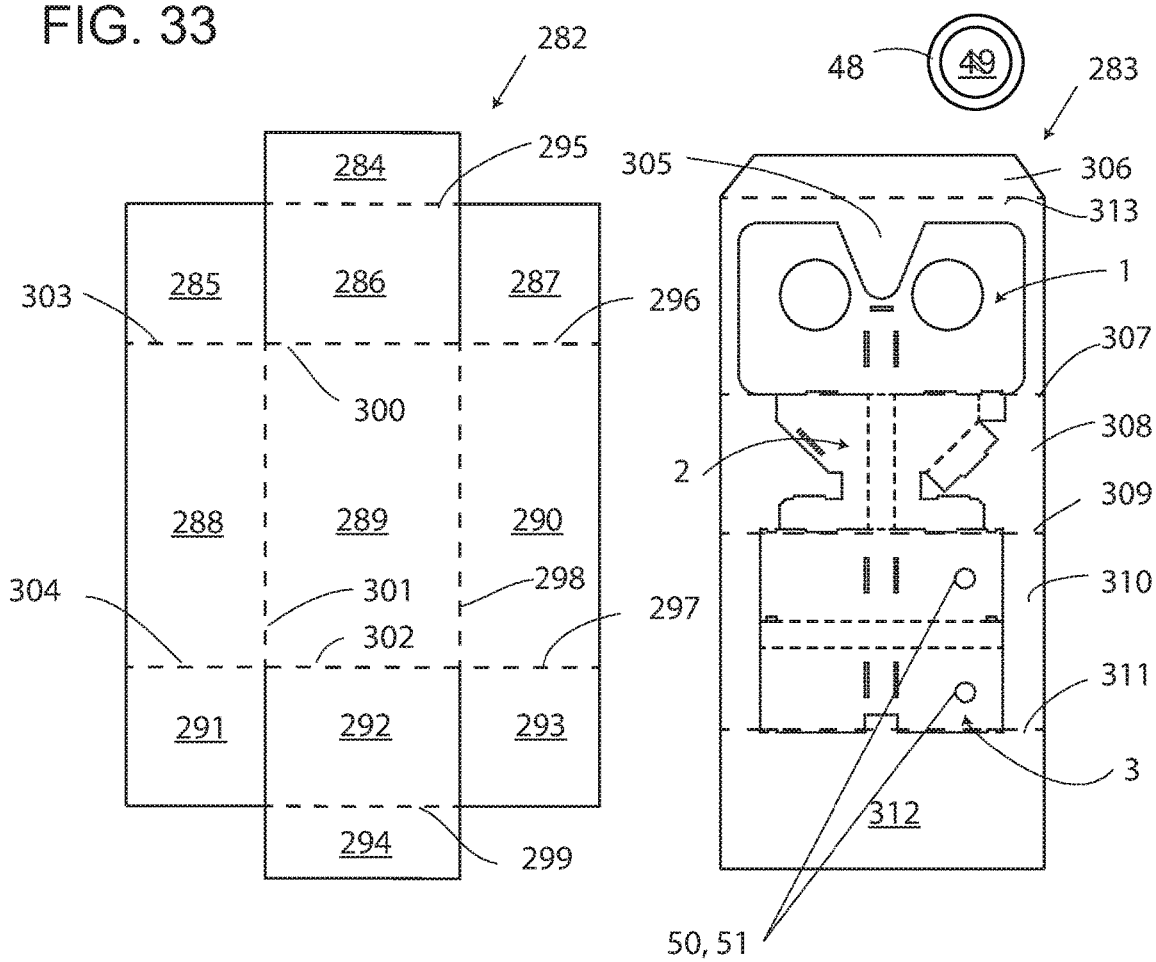

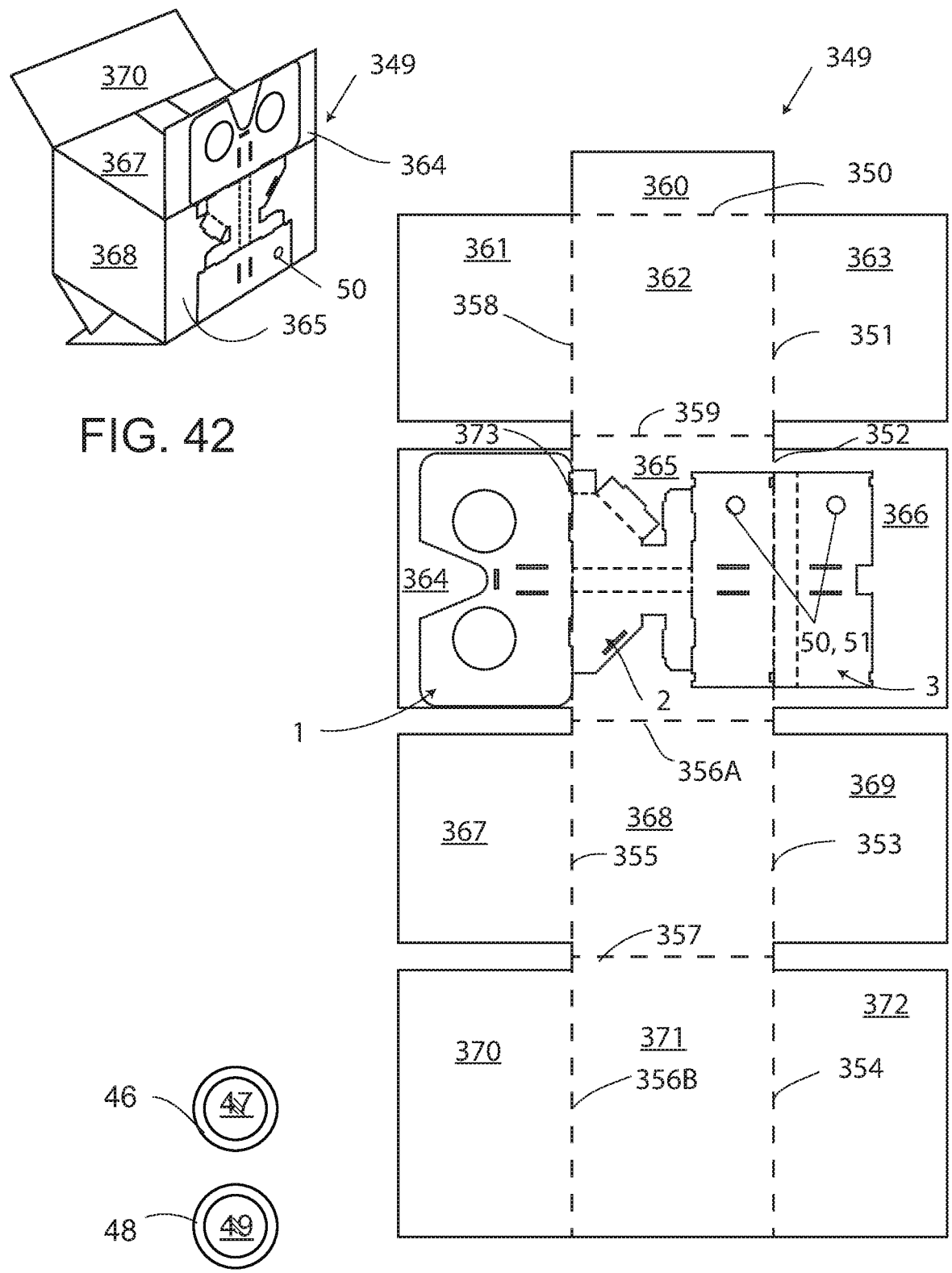

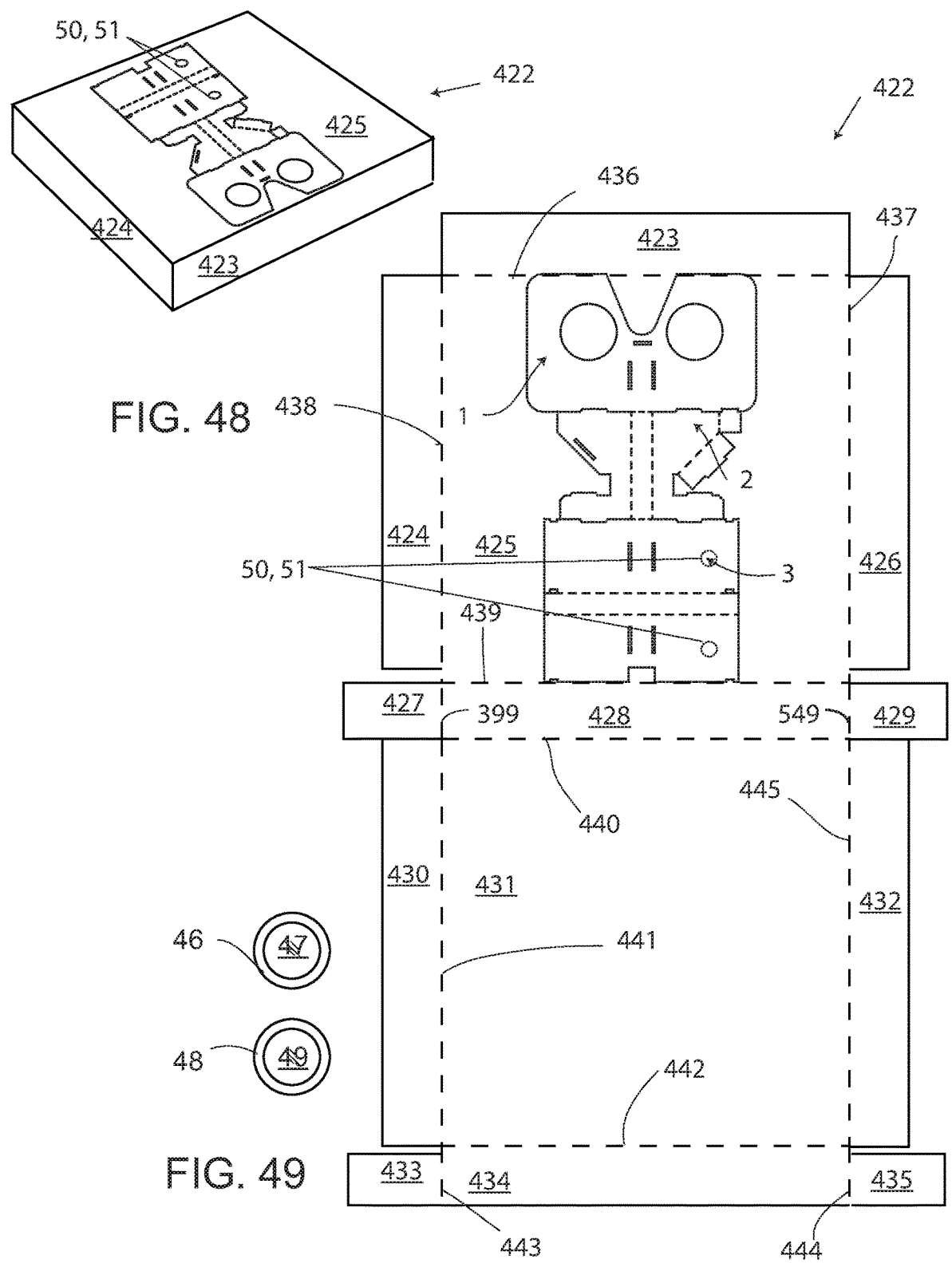

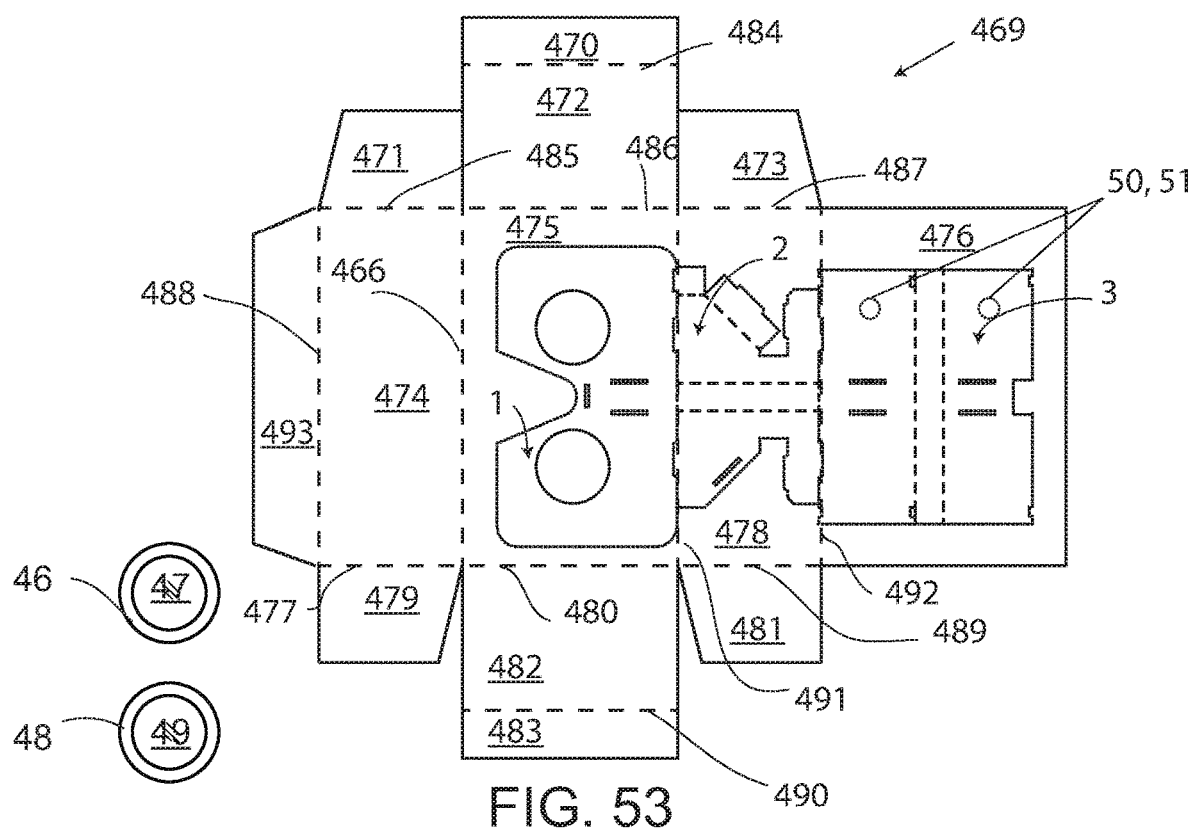

FOLDABLE VIRTUAL REALITY VIEWER STRUCTURE INTEGRATED IN MAILER AND/OR PRODUCT PACKAGING

CONTINUITY

This application is a Continuation-in-Part of Continuation patent application Ser. No. 15/160,539, filed on May 20, 2016, which is a continuation of non-provisional patent application Ser. No. 15/131,015, filed on Apr. 17, 2016, which claims priority to provisional patent application No. 62/103,096, filed on Jan. 14, 2015, and priority is claimed thereto.

FIELD OF THE PRESENT INVENTION

The present invention relates generally to personal virtual reality viewers for use with a smart device, and more specifically relates to a virtual reality viewer constructed from the packaging or mailer of a related or unrelated product by the user.

BACKGROUND OF THE PRESENT INVENTION

Traditional foldable viewers are box-type viewers that include a pair of optical lenses locked in one position to view stereoscopic images appearing as slides, film, and/or transparencies. Users hold the viewer up to a light source so that the translucent image can shine through and produce a three-dimensional image. The three-dimensional images are limited by the perspective taken in the transparencies. The foldable viewers were designed to view three-dimensional images from photographic images, not on smart devices.

The conventional box-type viewers were constructed from single cardboard or paper stock with flaps and tabs to fold and form a single end product as box-type viewers. Exemplary of these stereographic viewer are disclosed in U.S. Pat. Nos. 4,175,828, 4,242,818, and 5,894,365. Such designs were a disposable photographic film strip viewer that required a light-emitting opening in the front wall to view illuminating images in stereoscopic perspectives through its lenses. These references discloses a viewer where it is stand-alone product that cannot collapse into a form of mailer or be integrated into product packaging in any way.

U.S. Pat. No. 4,973,087 A, filed on May 25, 1990 by John Balogh for a 'Special effect postcard with integral viewer,' discloses an anaglyphic viewer made from card stock in a form of a postcard, mainly for marketing use. The prior art had two components where one part had an anaglyphic print and the other, defined by perforated demarcation, was a pair of red and blue tinted stereoscopic windows, not with lenses. The drawback of the prior art was its limitation of using prescribed printed anaglyphic image.

Another example of a collapsible box-type viewer configured into a compact size is disclosed in U.S. Pat. No. 6,069,735, filed on Dec. 10, 1998 by Murphy. The reference viewer, also for use with photographic images, has a rigid assembly with lateral walls that block off light during viewing and a face plate to hold lenses in proper optical alignment. The advantage of this viewer is its rigid assembly folded to fit inside a cd case. The objective of prior art viewer has a marketing advantage of packaging the viewer with cd products. Such design isolates packaging as a separate entity.

The virtual reality display systems evolve into an electronic deployed head or helmet mounted display that placed a viewing screen in front of the user's eyes and recorded the movement of the user's head to move determine what should be shown on the display. When the head turned to one side, the display was refreshed to show what was in the virtual world in the direction they turned their head. In these systems, the optical lenses are in fixed positions. While image quality of the virtual reality visualization systems have improved, known systems of this prior art have certain drawbacks to the bulkiness of the housing in these virtual reality display systems and require connection to a computer of high-end graphics capability. Exemplary of virtual reality headset is disclosed in U.S. Pat. No. D 701,206 S1, for a Virtual Reality Headset, filed on Jun. 4, 2013. While these prior art offer an enhanced immersive experience, the viewers are not integrated with the product packaging or form of mailer.

Virtual reality systems are used for virtual tours, branding, advertisement, entertainment, gaming, art, education, medicine, sport, and training for military, fire, and police. In recent years, virtual reality systems can be viewed on smart devices by downloading software application with virtual reality environment display. This current cardboard viewer is constructed as a single-use end product, a virtual reality viewer.

Prior art devices for use with smart devices, similar to Google Cardboard™, require a smart device and a stereoscopic viewer to operate. Each of these components has separate product packaging and additional shipping mailer that is usually discarded shortly after users receive the intended goods, which can be a waste of resources. Reusing product packages help save trees and reduce use of resources such as water, oil, and energy. In some cases, the byproduct of the packaging cannot be recycled because it contains other non-recycling material and eventually ends up in landfill.

Other prior art devices are the stand-alone unit, similar to Oculus VR, Inc™, that has built-in gyroscope and accelerometer and requires connection to conventional computer to operate. These products can also benefit from this invention. Its product packaging can be folded into an additional pair of stereoscopic viewer for use with mobile smart device.

Prior art for conventional packaging is constructed either for a single-use end product as mailer or as advertising device, but not for multi-functional use as packaging and virtual reality viewer. Exemplary of the conventional boxes are disclosed in U.S. Pat. No. 9,131,757. U.S. Pat. No. 9,131,757, filed on Feb. 18, 2014 by Chien-Feng Tseng, discloses a packaging box for electronic device as a phone case. The packaging box is a hollow triangular prism with a tray and lid assembly. The tray is attached to a mounting board to house device. The mounting board is shaped to fit the device in lateral or rotated to an upright position. While the prior art meets its objective as a packaging box and a phone case, it is not offered as a virtual reality viewer.

Thus, there is a need for a new form of virtual reality viewing apparatus that facilitates a VR experience that is crafted for everyday use, is configured to be used with mobile applications on a smart device rather than a conventional computer, and that is fashioned out of a mailer, shipping box, or similar product packaging for immediate construction and use by the user.

SUMMARY OF THE PRESENT INVENTION

The present invention is a method of assembling planar surface(s) of any foldable material into a virtual reality viewer that is comprised of three primary components: a face plate, a spine/frame, and a back plate. In the preferred embodiment of the present invention, a foldable design for a virtual reality viewer is disclosed for use with a smart device, such as a smartphone. The viewer can also be distributed in its unfolded or 'flat' shape. Dashed lines and pre-formed creases delineate sections (panels and flaps) to be folded by the user to form the detached piece into a viewer, consisting of the face plate, the spine/frame, and the back plate. The optical system of the present invention includes a pair of biconvex lenses (25 mm-45 mm) that attach to the back side of the face plate with adhesives. The lenses may be available as a unitary piece in some embodiments, and are held in place to the back plate via tabs. The smart device rests securely against the back plate of viewer with elastics, rubber bands, Velcro™, fabric, and/or another conventional attachment means. Suction tape can be applied to the back plate for additional reinforcement to secure the device in position against the back plate. Cutouts on the back plate keep the ties stable in position. A user can access a touch screen of the smart device without removing the smart device out from the viewer. For hands-free use, the viewer can be attached to headgear such as a cap or hat using Velcro™ strips, micro suction pad, hooks, 3M™ Dual Lock™ reclosable fasteners, magnets, and/or another conventional attachment mechanism. The mailer and/or product packaging may be printed with assembly instructions for the viewer, advertisement, and/or product information.

In a second through the twenty-sixth embodiment, the present invention is incorporated as part of product package. An unassembled viewer is detached via perforations in the mailer, package, flyer, or one-piece foldable planar surface. The method of assembling the viewer is the same as described in the preferred embodiment of the present invention. In a twenty-seventh embodiment, the present invention is in the shape of an enclosure containing a cover, a bottom wall, and side panels. The viewer features, a face plate, a spine/frame, and a back plate, which are partially assembled, but require the user to detach perforated areas for lenses, nose openings, and opening to access device. Once the lines of perforations for the lenses are detached, the lens panel is attached to the back of the face plate. The smart device rests on the back plate with elastics, rubber bands, Velcro™, fabric, and/or another conventional attachment mechanism. Suction tape can be applied to the back plate for additional stability. Straps are attached to side of exterior side panel for hands-free use or for carry.

The viewer can be constructed from any foldable material including stock material, cardboard, paper, felt, plastic, polypropylene, polyethylene, cardboard, nylon, or aluminum, which may be matte, textured, coated, or smooth finish. If constructed on cardboard, the lines of corrugation are preferably aligned in a longitudinal direction with viewer as shown in FIGS. 4A and 4B for stronger structural integrity. The misalignment in the latitudinal direction may weaken the structural performance of the viewer and creases to tear easily on cardboard. A water-resistant coating or laminate may be applied to the surface of the cardboard to strengthen areas of wear and tears.

The invention is a sturdy, reusable, and collapsible virtual reality headset to view two-dimensional offset images as a single three-dimensional display, giving the illusion of depth perception, from a smart device.

In a first embodiment, the present invention provides a foldable design for a virtual reality headset for use with a smart device. The frame design of structural folds allows the headset to be configured into a compact and self-contained case for easy storage and transport.

Additionally, the present invention provides novel features to enhance the comfort and portability of the virtual reality headset for everyday use. For durability, the collapsible viewer is preferably made of water-resistant materials. The design of the structural folds of the present invention are crafted for adaptable use with straps to employ the viewer as a headset, or coupled with headphones or haptic devices to control the software application on the smart device. This suspension mechanism helps to offset the weight of the viewer and the smart device, making the invention comfortable for extended use. A silicone, foam, or EPDM rubber material is preferably placed around the contour lip of the edges that contact the user's face for comfort, and to add rigidity to the main body of the viewer. Furthermore, the user can be reassured that the smart device is stable in position and will not fall off or out of the viewer housing with the use of elastic.

BRIEF DESCRIPTION OF THE DRAWINGS

The present invention will be better understood with reference to the appended drawing sheets, wherein:

FIG. 2 details the components of the present invention.

FIG. 3A details a perspective view of the present invention as shown in the fully assembled condition from the front.

FIG. 13 displays a top-plan view of the present invention as shown in the fully assembled condition with the smart device and the haptic device attached and strapped to headgear.

FIG. 13A shows a haptic device attached to the apparatus of the present invention via elastic or rubber bands.

FIG. 14 details a right side elevation view of the present invention as shown in the fully assembled condition with the smart device and the haptic device attached and strapped to headgear.

FIG. 15 details a left side elevation view of the present invention as shown in the fully assembled condition with the smart device and the haptic device attached and strapped to headgear.

FIG. 18 exhibits an assembled view of the fourth embodiment on a regular slotted carton package.

FIG. 19 displays a top-plan view of the fourth embodiment of the present invention on a regular slotted carton package.

FIG. 20 exhibits an assembled view of the fifth embodiment of the present invention on a half-slotted carton package.

FIG. 21 displays a top-plan view of the fifth embodiment of the present invention on a half-slotted carton package.

FIG. 22 exhibits an assembled view of the sixth embodiment of the present invention on a full overlap slotted carton package.

FIG. 23 displays a top-plan view of the sixth embodiment of the present invention on a full overlap slotted carton package FIG. 24 exhibits an assembled view of the seventh embodiment of the present invention on a one-piece folder package.

FIG. 28 exhibits an assembled view of the ninth embodiment of the present invention on a full-lid lift top/telescope package.

FIG. 29A displays a top-plan view of the ninth embodiment of the present invention on a full-lid lift top/telescope package.

FIG. 29B displays a top-plan view of the ninth embodiment of the present invention on a full-lid lift top/telescope package.

FIG. 30 exhibits an assembled view of the tenth embodiment of the present invention on a half-lid lift top/telescope package.

FIG. 31 displays a top-plan view of the tenth embodiment of the present invention on a half-lid lift top/telescope package.

FIG. 32 displays a top-plan view of the tenth embodiment of the present invention on a half-lid lift top/telescope package.

FIG. 33 exhibits an assembled view of the eleventh embodiment of the present invention on a sleeve and tray package.

FIG. 34 displays a top-plan view of the eleventh embodiment of the present invention on a tray package.

FIG. 35 displays a top-plan view of the eleventh embodiment of the present invention on a sleeve package.

FIG. 42 exhibits an assembled view of the fifteenth embodiment of the present invention on an alternate regular slotted carton package.

FIG. 43 displays a top-plan view of the fifteenth embodiment of the present invention on an alternate regular slotted carton package.

FIG. 48 exhibits an assembled view of the eighteenth embodiment of the present invention on a one-piece collapsible tray with lid.

FIG. 49 displays a top-plan view of the eighteenth embodiment of the present invention on a one-piece collapsible tray with lid.

FIG. 52 exhibits an assembled view of the twentieth embodiment of the present invention on a straight tuck with slit lock.

FIG. 53 displays a top-plan view of the twentieth embodiment of the present invention on a straight tuck with slit lock.

Figure 1:
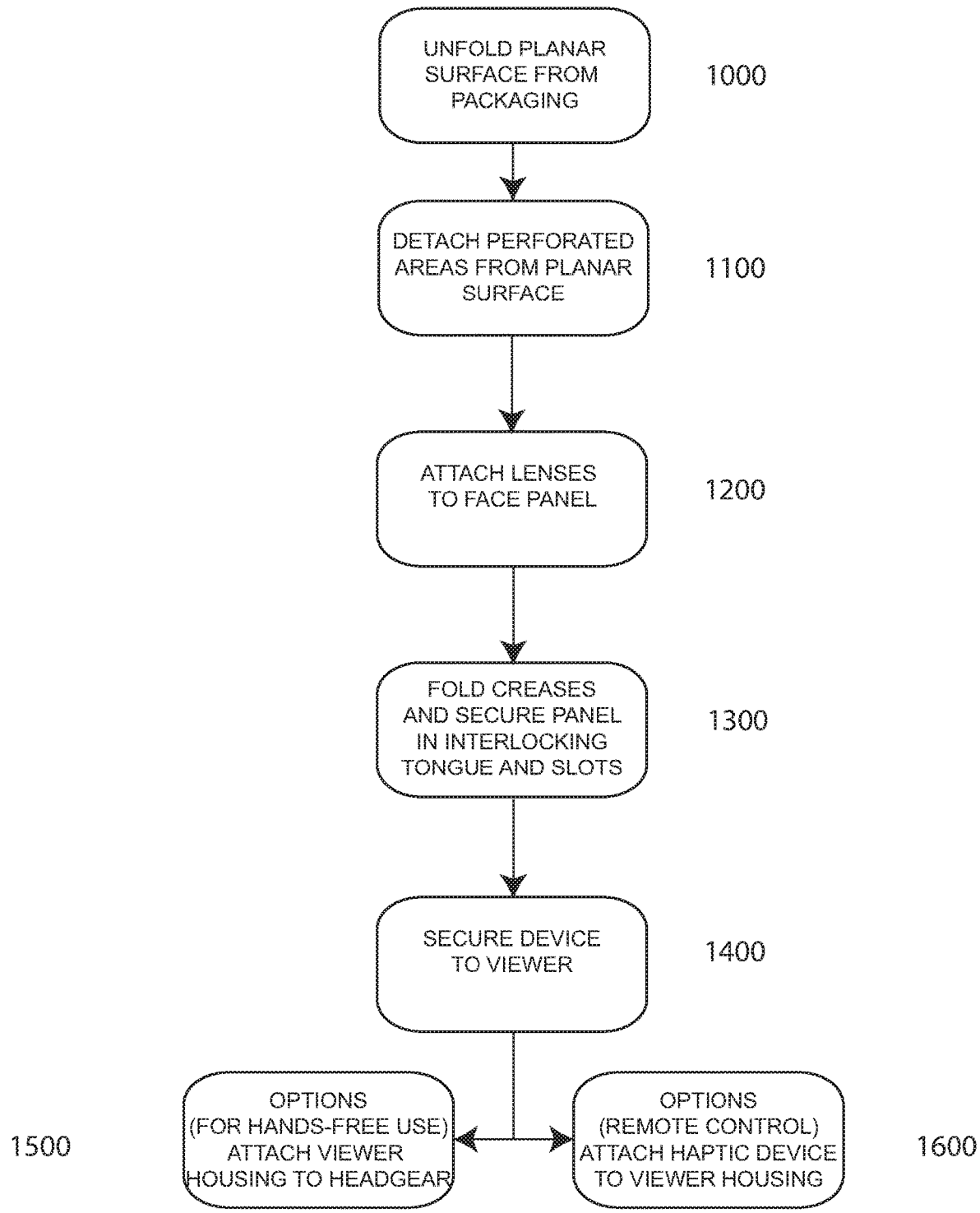
FIG. 1 shows a flow diagram detailing a method of assembling of the present invention.

The broken lines shown in the drawings represent portions of the virtual reality headset that form no part of the claimed design.

DETAILED DESCRIPTION OF THE PREFERRED EMBODIMENT

The present invention generally comprises a virtual reality viewer construction configured to create a lightweight, portable, foldable, stereoscopic viewer out of planar materials, such as a cardboard box or similar enclosure. A first embodiment of the virtual reality viewer is formed of a single panel of high strength, bendable, foldable material. The panel is shaped and creased so that it may be folded and assembled into a face plate (1), a spine/frame (2), and a back plate (3) of the virtual reality viewer to enable a user to view a three-dimensional environment.

All embodiments of the present invention are envisioned to be refolded and reassembled at the will of the user.

Figure 3B:
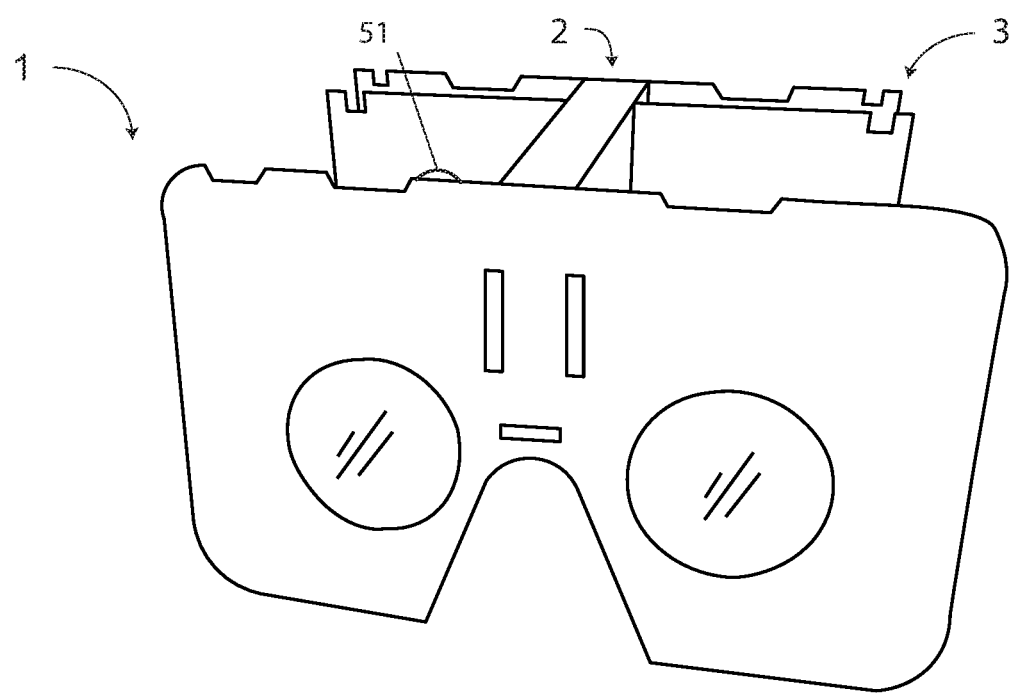
FIG. 3B details a close-up view of the present invention as shown in the fully assembled condition from the front.

The method of assembling and the components of the present invention, as depicted in FIGS. 1-2, is described as follows:

1. The convertible virtual reality viewer of the present invention is illustrated in FIG. 3A, FIG. 3B, and FIG. 66, and is comprised of a face plate (1), a spine/frame (2), and a back plate (3). FIG. 16A, FIG. 17, FIG. 19, FIG. 21, FIG. 23, FIG. 25, FIG. 27, FIG. 29A, FIG. 32, FIG. 35, FIG. 37, FIG. 39, FIG. 41, FIG. 43, FIG. 45, FIG. 47, FIG. 49. FIG. 51, FIG. 53, FIG. 55, FIG. 57, FIG. 59, FIG. 61, FIG. 63, and FIG. 65 show embodiments of the present invention on different planar surfaces. To assemble the viewer, lines of perforations delineate detachable areas of the package, mailer, or other planar surface that folds into the viewer of the present invention.

2. Biconvex lenses (47, 49) are attached to the back side of the face plate (1). The biconvex lenses (47, 49) may be configured as a unitary piece.

Figure 8A:
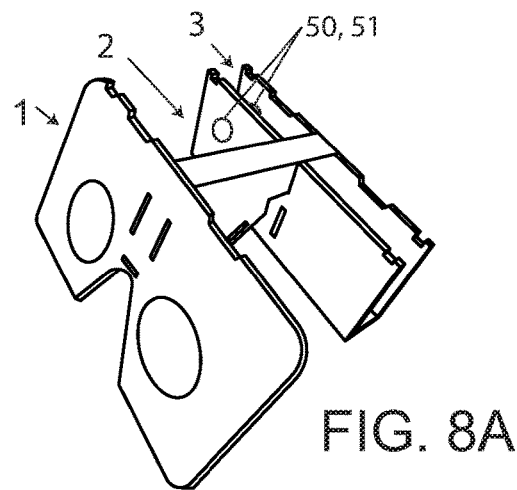
FIG. 8A displays a third and final portion of a sequence of perspective views depicting the folding of the present invention.

3. Creases (33), (34), (35), (36), (37), and (38) are folded downward form the spine/frame (2) of the viewer. To secure the panels (10), (11), (12), (13), and (14) in position, a flap (16) is inserted into a slot (15). Flap (44) is inserted into slot (7), flap (45) is inserted into slot (8), and flap (43) is inserted into slot (9) to attach the frame (2) to the face plate (1) as shown in FIG. 8A.

4. Creases (39) and (40) are folded downward to form the back plate (3) of the viewer. To secure the back plate (3) in position with the frame (2), as shown in FIG. 8A, flaps (18-19) are slid into slots (24-25) and flap (17) and flap (20) into slot (26) and slot (27) respectively.

5. The face plate (1) and the back plate (3) preferably rest perpendicularly to the frame (2) in the assembled position.

Figure 12:
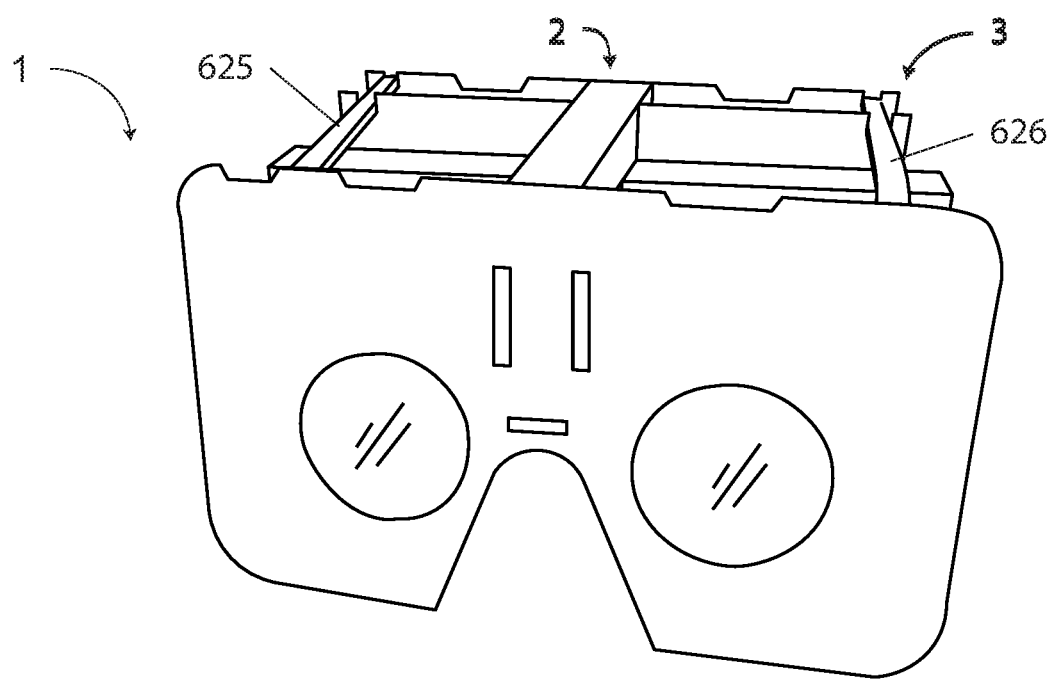
FIG. 12 is a perspective view of the present invention as shown in the fully assembled condition with the smart device attached.

6. To attach the device (61) to the viewer as shown in FIG. 12, the user secures the device (61) to the back plate (3) in position with the notch (31) by looping an elastic or rubber band (625) between slot (28), slot (30), and slot (41), as well as looping a band (626) through another one around slot (29), slot (32), and slot (42). The user has direct touch access to the screen of the device (61) without removing the device (61) out from the viewer.

7. To assemble the viewer for hands-free use as shown in FIGS. 13-15, the users places an elastic or rubber band (627) between the ends (17, 20) and panel (22), and preferably loops around headgear such as a cap or hat.

8. The user may optionally attach a haptic device (624) to panel (21) by looping the elastic or rubber band (625, 626) used to secure the smart device (61) around it.

An alternate embodiment of the present invention as depicted in FIG. 66, is preferably outlined and assembled as follows:

9. The twenty-seventh preferred embodiment features an alternative convertible viewer and comprised of face plate unit (91) and a combination of frame and back plate unit (92).

10. The twenty-seventh preferred embodiment is a box-type apparatus such as a gift box, shoe box, mailer, and any conventional packaging.

11. To assemble the viewer, lines of perforations delineate detachable areas for slot (67) and slot (68) for the pair of biconvex lenses (47, 49), slot (65) and slot (75) for the nose of the user, and for slot (66, 85) to provide the user access to the screen of the device (61).

12. To assemble the face plate unit (91), the pair of biconvex lenses (47, 49) are secured between panel (55), panel (56), and panel (57), as well as attached to the interior side of the lid (54).

13. The outer lid (92) includes assemblies (90), panel (59) and panel (62).

14. The smart device (61) is preferably attached to panel (62) by an elastic or rubber band (63). The smart device (61) can also attach to panel (62) with a micro suction pad (64) in addition to the rubber band (63), providing additional reinforcement to prevent unwanted detachment of the smart device (61) from the present invention.

15. To assemble the viewer for hands-free use as shown in FIG. 66, head straps (95) to panel (81) and panel (83) with Velcro™ strips, micro suction pad, hooks, 3M™ Dual Lock™ reclosable fasteners, magnets, and/or another conventional attachment means.

16. The user can also attach a haptic device (624) or motion sensor to the front cover of the viewer housing with Velcro™ strips, micro suction pad, hooks, 3M™ Dual Lock™ reclosable fasteners, magnets, and/or conventional attachment to a slit opening as remote controls to operate the VR software app.

As shown in FIG. 3A and FIG. 3B, the dashed lines and pre-formed creases delineate the sections to be folded by the user to form the detached piece into a stereoscopic viewer, consisting of a face plate (1), a spine/frame (2), and a back plate (3), essential for the purposes of the invention. The face plate (1) holds a pair of biconvex lenses (47, 49) in place. The spine/frame (2) can be structural and is used as a guide to center the smart device inside viewer. The smart device rests securely against the back plate (3) with elastics, such as rubber bands (625, 626), Velcro™, fabric, and/or another conventional attachment mechanism as shown in FIG. 12. The present invention is envisioned to be constructed from any foldable stock material.

Figure 4A:
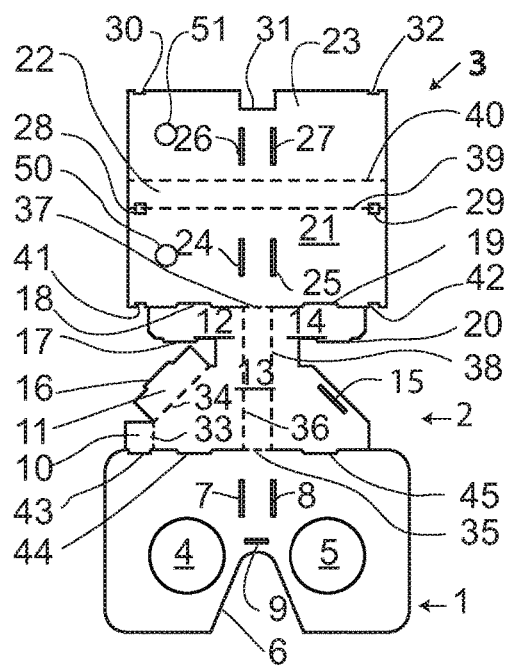
FIG. 4A displays a top-plan view of a blank of the present invention as shown in the unfolded condition.
Figure 4B:
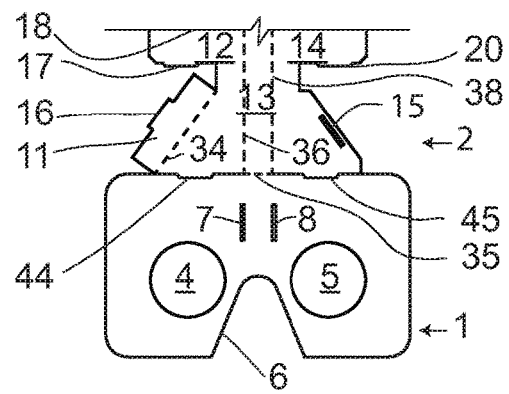
FIG. 4B displays a top-plan view of an alternate embodiment of a blank of the present invention shown without tab 10 and slot 9.

As shown in FIGS. 4A and 4B, the present invention has a face plate (1) equipped with nose cutout (6), lens cutout (4), and lens cutout (5). It should be noted that lens cutout (4) could be shaped like eyebrows or could be shaped to resemble features of a face/character brand logo. Lenses (47) and (49) are preferably attached to the back of the face plate (1) with an adhesive strip (46) and adhesive strip (48), illustrated in FIG. 5A. The pair of biconvex lenses (47, 49) is oriented such that the sides of lesser curvature of the pair of biconvex lenses (47, 49) are facing away from the smart device (61) and facing the user.

Figure 5A:
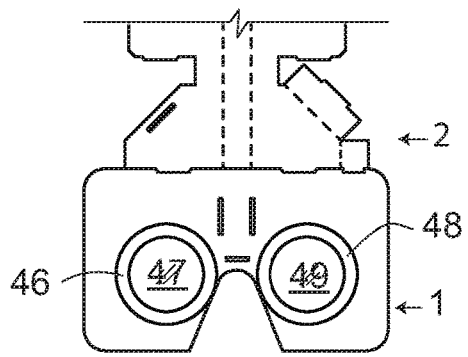
FIG. 5A exhibits a back view of the face plate of the present invention.
Figure 6A:
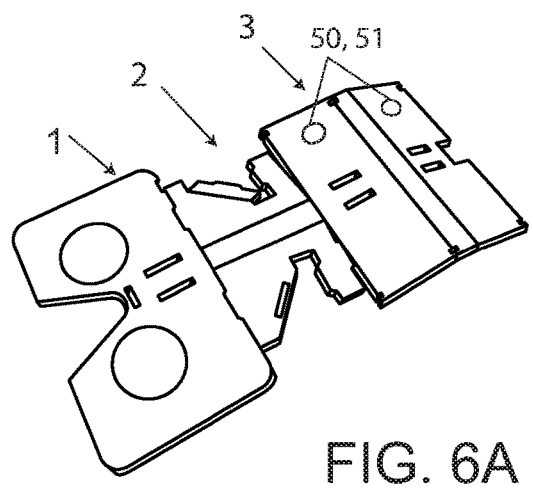
FIG. 6A displays a first portion of a sequence of perspective views depicting the folding of the present invention.
Figure 7A:
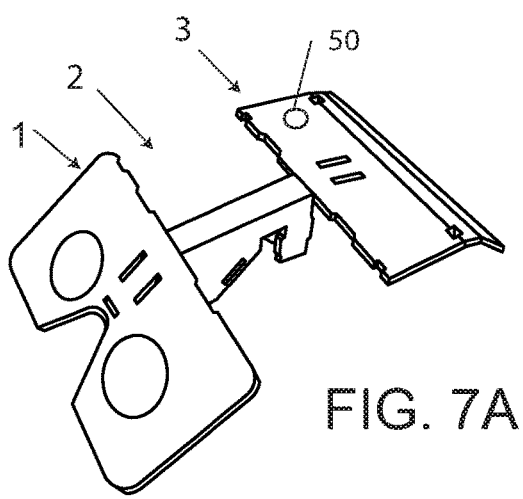
FIG. 7A displays a second portion of a sequence of perspective views depicting the folding of the present invention.
Figure 4C:
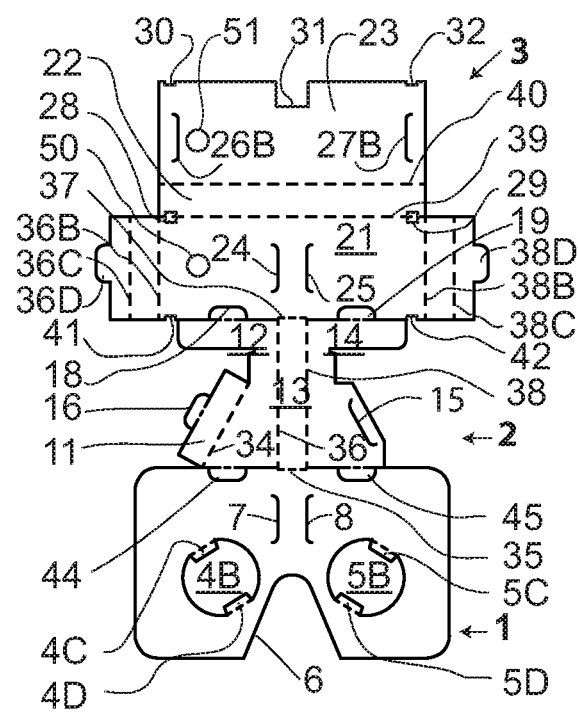
FIG. 4C displays a top-plan view of an alternate embodiment of a blank of the invention as shown in the unfolded condition.
Figure 5B:
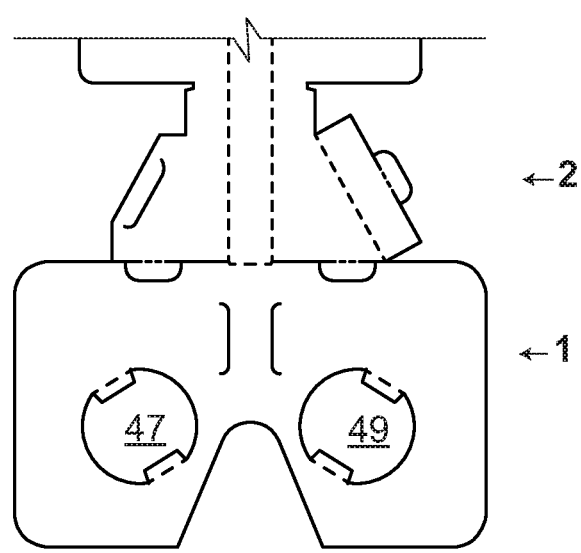
FIG. 5B exhibits a back view of the face plate of the alternate embodiment.

Another alternate embodiment of the present invention is detailed in FIG. 4C, FIG. 5B, FIG. 6B, FIG. 7B, and FIG. 8B. As shown in FIG. 4C, the alternate embodiment of the present invention has a face plate (1) equipped with nose cutout (6), lens cutout (4B), and lens cutout (5B). It should be noted that lens cutout (4B) could be shaped like eyebrows or could be shaped to resemble features of a face/character brand logo. The planar surface of the face plate (1) may also be shaped to resemble an object and/or character brand/logo. Lenses (47) and (49) are preferably attached to the back of the face plate (1) using tabs (4C, 4D, 5C, 5D) to keep in place as shown in FIG. 4C and/or with an adhesive strip (46) and adhesive strip (48) as illustrated in FIG. 5A. The pair of biconvex lenses (47, 49) is oriented such that the sides of lesser curvature of the pair of biconvex lenses (47, 49) are facing away from the smart device (61) and facing the user. The pair of biconvex lenses (47,49) could come as one piece and secure in position by tabs (4C, 4D, 5C, 5D).

Figure 6B:
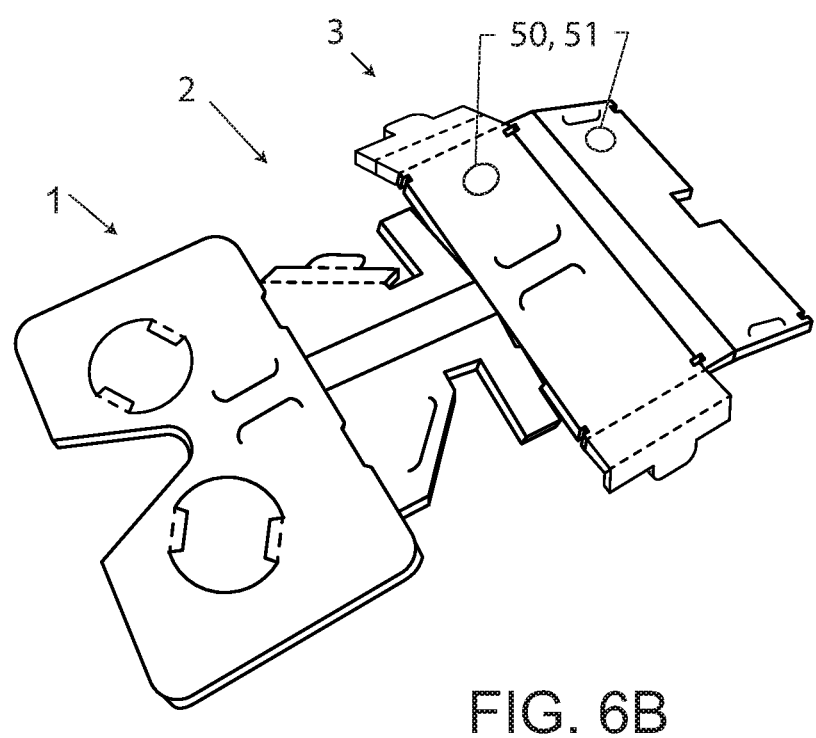
FIG. 6B displays a first portion of a sequence of perspective views depicting the folding of the alternate embodiment.
Figure 7B:
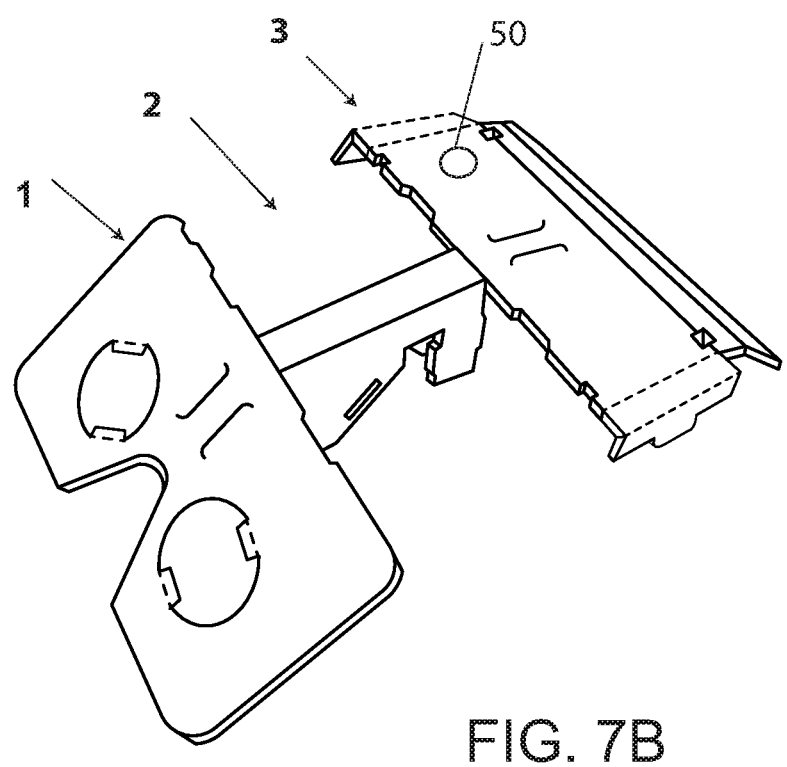
FIG. 7B displays a second portion of a sequence of perspective views depicting the folding of the alternate embodiment.
Figure 8B:
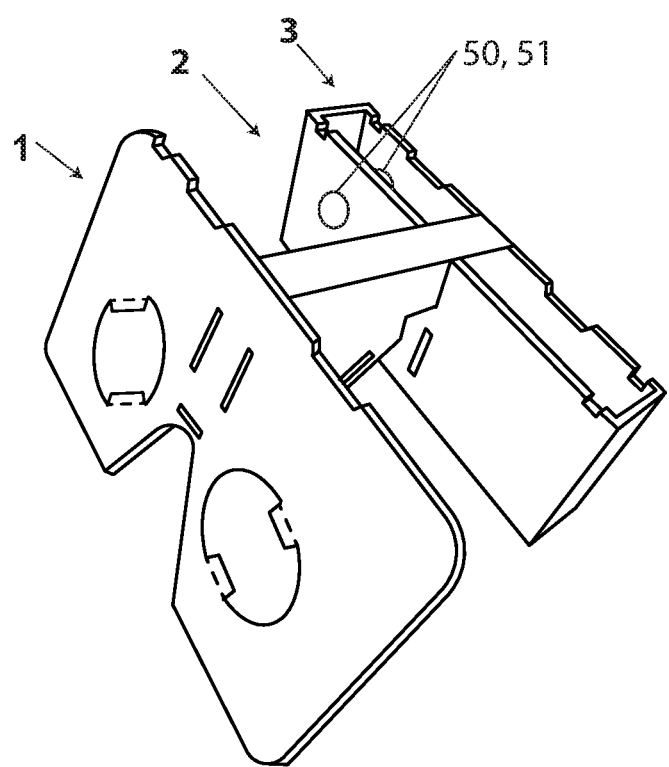
FIG. 8B displays a third and final portion of a sequence of perspective views depicting the folding of the alternate embodiment.

FIGS. 6B, 7B, and 8B sequentially illustrate the assembly of the alternate embodiment of the present invention into an assembled viewer. Creases (34), (35), (36), (37), and (38) are folded downward form the spine/frame (2) of the viewer. To secure panels (11-14) in position, flap (16) is inserted into slot (15) by the user. Flap (44) is then inserted into slot (7) and flap (45) is inserted into slots (8), as shown in FIG. 8B. Crease (39) and crease (40) are folded downward to form the back plate (3) of the viewer. To secure the back plate (3) in position with the frame (2), flap (18) and flap (19) are slid into slot (24) and slot (25) respectively, and flap (36D) and flap (38D) are slid into slot (26B) and (27B) respectively by folding creases (36B, 36C, 38B, 38C) inward to form side panels, reinforcing the back panel as illustrated in FIGS. 4C, 6B, 7B, and 8B. Camera perforations (50, 51) provide access to a camera lens of the small-sized device (61) as shown in FIG. 8B and FIG. 12. The alternate embodiment of the present invention has perforations disposed on the planar surface which are strong enough to be fed through a printer. Cutouts can easily be removed from sheet along the separation lines and folded into a virtual reality viewer.

FIGS. 6A-8B sequentially illustrate the assembly of the present invention into an assembled viewer, refer to component parts in FIG. 4A and FIG. 4C. Creases (33), (34), (35), (36), (37), and (38) are folded downward form the spine/frame (2) of the viewer. To secure panels (10-14) in position, flap (16) is inserted into slot (15) by the user. Flap (44) is then inserted into slot (7) and flap (45) is inserted into slots (8), and flap (43) is inserted into slot (9) to attach the frame (2) to the face plate (1), as shown in FIG. 8A. Crease (39) and crease (40) are folded downward to form the back plate (3) of the viewer. To secure the back plate (3) in position with the frame (2), flap (18) and flap (19) are slid into slot (24) and slot (25) respectively, and flap (17) and flap (20) are slid into slot (26) and (27) respectively.

Figure 9:
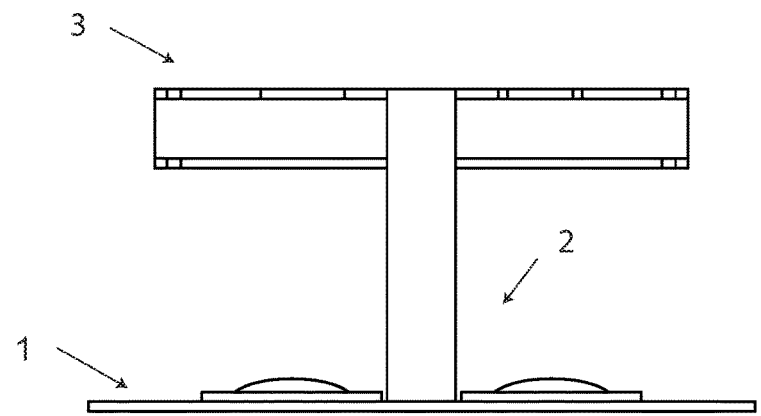
FIG. 9 is the top plan view of the present invention as shown in the fully assembled condition.
Figures 10, 11:
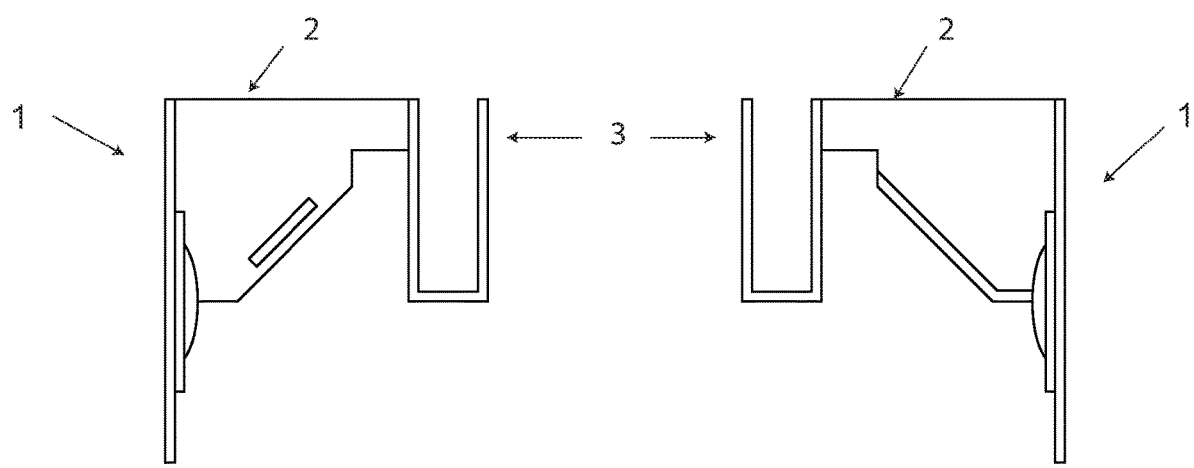
FIG. 10 is a right side elevation view of the present invention as shown in the fully assembled condition.
FIG. 11 is a left side elevation view of the present invention as shown in the fully assembled condition.

The face plate (1) and back plate (3) should rest perpendicularly to the frame (2) in the assembled position, as shown in the fully assembled condition detailed in FIGS. 9-11. The smart device (61) is attached to the viewer as shown in FIG. 12 by securing the device to the back plate (3) in position with the notch (31) with an elastic or rubber band (625) looped between slots (28, 30, 41) and another rubber band (626) around slots (29, 32, 42). The back plate (3) with slots (50, 51) should not cover the camera lens of the device (61) when attached to viewer.

To assemble the viewer for hands-free use as shown in FIGS. 13-15, an elastic or rubber band (627) is placed between the ends (17, 20) and panel (22), and is looped around headgear such as cap or hat. A haptic device (624) can be attached to panel (21) by looping the elastic or rubber bands (625, 626) used to secure the smart device (61) around it as shown in FIG. 13A.

Second through the twenty-sixth embodiments of the present invention (as shown in FIG. 16A, FIG. 17, FIG. 19, FIG. 21, FIG. 23, FIG. 25, FIG. 27, FIG. 29A, FIG. 32, FIG. 35, FIG. 37, FIG. 39, FIG. 41, FIG. 43, FIG. 45, FIG. 47, FIG. 49. FIG. 51, FIG. 53, FIG. 55, FIG. 57, FIG. 59, FIG. 61, FIG. 63, and FIG. 65) illustrate how the viewer is preferably incorporated into any product packaging, mailer, flyer, container, gift box, business card, invitation, coupon, bag, envelope, box, advertising display and material, goggles, glasses, and/or any generally planar surface. The detachable portion of the invention is preferably perforated on the planar surface to facilitate quick construction of the virtual reality viewer of the present invention.

Figures 16A, 16B:
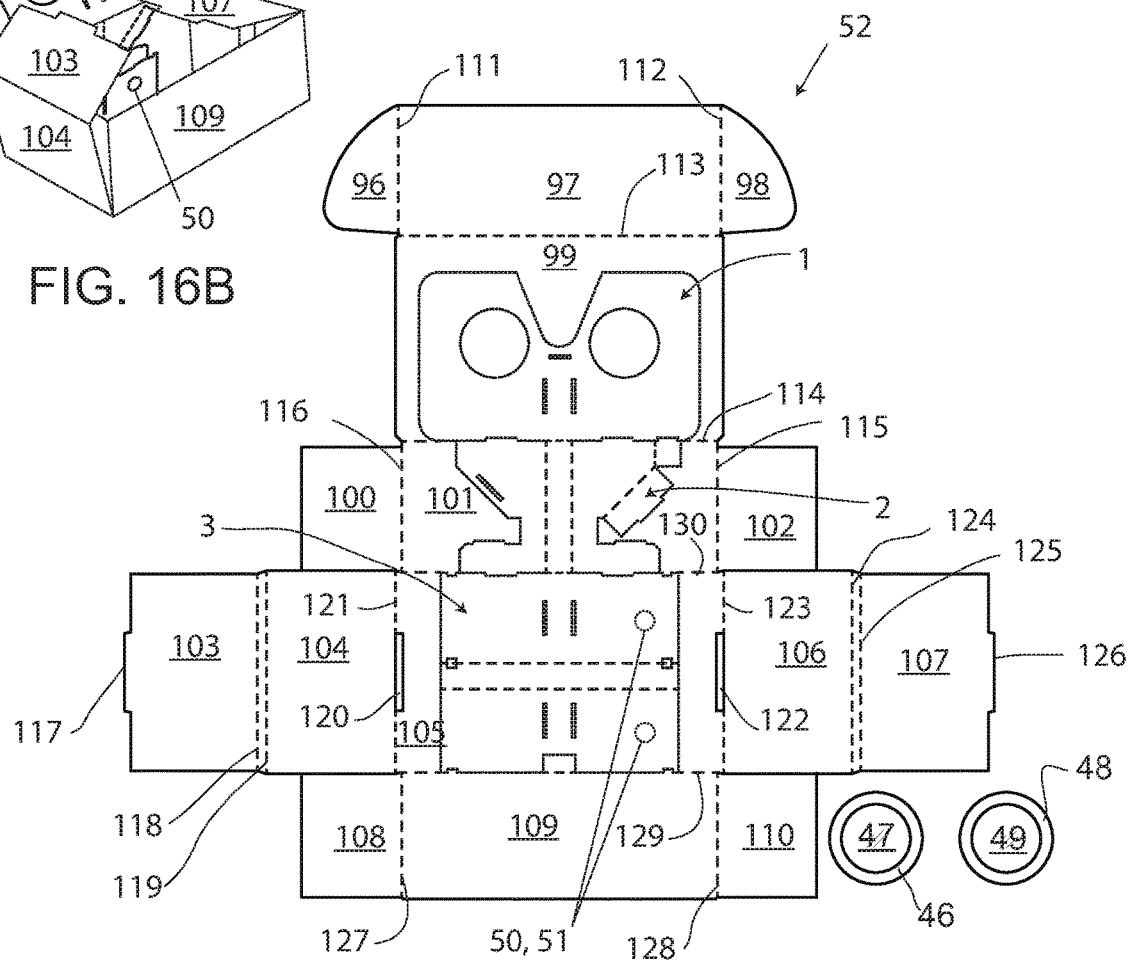
FIG. 16A exhibits a top-plan view of a blank of the second embodiment of the present invention on a mailer package or a roll end lock front package.
FIG. 16B exhibits an assembled view of a blank of the second embodiment of the present invention on a mailer package or a roll end lock front package.

In the second embodiment of the present invention as shown in FIG. 16A, the invention is incorporated into a mailer package (52). The mailer can be constructed from single cardboard or any material with flaps and tabs folded to form an enclosed box with front wall (97), top wall (99), left wall (104), right wall (106), back wall (101), and bottom wall (105), defined by fold lines (113), (114), (130), (121), (123), and (129). Fold lines (121), (123), (130), and (129) are creased upwardly, defining the bottom wall (105). Flaps (100), (102), (108), and (110), along creases (116), (115), (127), and 128), are folded over to be inserted panels (103) and (104) and flaps (102) and (110) between panels (106) and (107). Side walls (104), (101), (106), and (109) along creases (118), (119), (124), and (125) are secured in a folded position by inserting locking tab (117) into slot (120) and tab (126) into slot (122). Crease (111) and (112) are folded to form closure tabs (96) and (98). To enclose the mailer as shown in FIG. 16B, closure tab (96) are secured between side walls (103) and (104), and closure tab (98) between the side walls (106) and (107). A tear away zipper on panel (97) could be an optional feature to the mailer package.

The detachable portion of the invention, a face plate (1), a spine (2), and a back plate (3), is attached on panels (99), (101), and (105) by perforations, allowing users to remove the detachable portion from the remaining part of mailer. A pair of biconvex lenses (47) and (49) with the adhesives (46) and (48) included as separate items inside the mailer package. The viewer is assembled as described in FIG. 1

Figure 17:
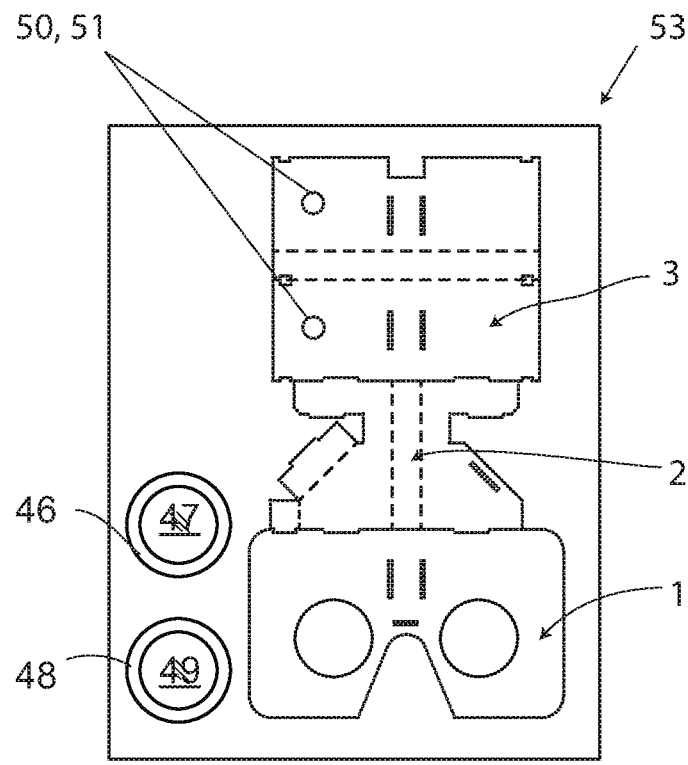
FIG. 17 displays a top-plan view of a blank of the third embodiment on single sheet of stock material.

FIG. 17 shows the third embodiment of the present invention incorporated with a flyer or a planar surface (53). The viewer, comprised of a face plate (1), spine (2), and back plate (3), is perforated on the planar surface. A pair of biconvex lenses (47) and (49) is attached to flyer with adhesives when distributed. The method of assembling the viewer is described in FIG. 1.

FIG. 19 exhibits the fourth embodiment of the present invention on a regular slotted carton package (131). As shown in FIG. 18, creases (145), (146), (147), (148), (149), (150), (151), (152), (153), (154), (155), and (156) fold inwardly to form a box, bounded by a front wall (137), a left wall (140), a back wall (139), a right wall (138), a top wall formed by panels (141), (142), (143), and (144), and bottom wall formed by panels (133), (134), (135), and (136). Adhesive is applied to the inner face of panel (132) and attach to interior side of panel (140). The top wall and bottom wall are sealed close with tape.

The detachable portion of invention, comprised of a face plate (1), spine (2), and back plate (3), is perforated on panel (137), but can be incorporated into any planar surface on package. A pair of biconvex lenses (47) and (49) with adhesives (46) and (48) is included with the package when distributed. The method of assembling the viewer is described in FIG. 1.

The fifth embodiment of the present invention, shown in FIG. 21, displays the viewer integrated into a half slotted carton package (157), defined by right wall (160), left wall (162), front wall (159), back wall (161), and bottom wall formed by panels (163), (164), (165), and (166). Creases (167), (168), (169), (170), (171), (172), (173), and (174) are folded inwardly to form the carton package as shown in FIG. 20. Adhesive is applied to the inner face of panel (158) and attach to interior side of panel (162). The bottom wall is sealed close with tape.

The detachable portion of invention, comprised of a face plate (1), spine (2), and back plate (3), is perforated on panel (159), but can be incorporated into any planar surface on package. A pair of biconvex lenses (47) and (49) with adhesives (46) and (48) is included with the package when distributed. The method of assembling the viewer is described in FIG. 1.

FIG. 23 shows the sixth embodiment of the present invention, the viewer incorporated into alternate slotted carton package (175). Creases (189), (190), (194), (195), (196), (197), (191), (192), (198), (199), (193), and (200) are folded inward to form a full overlap slotted carton package (175), bounded by right wall (178), left wall (180), front wall (177), back wall (179), top wall formed by panels (187), (185), (188), and (186), and bottom wall formed by panels (183), (184), (182), and (181). Adhesive is applied to the inner face of panel (176) and attach to interior side of panel (180) as shown in FIG. 22. The bottom wall and top wall can be sealed close with tape.

The detachable portion of invention, comprised of a face plate (1), spine (2), and back plate (3), is perforated on panel (177), but can be incorporated into any planar surface on package. A pair of biconvex lenses (47) and (49) with adhesives (46) and (48) is included with the package when distributed. The method of assembling the viewer is described in FIG. 1.

Figure 24:
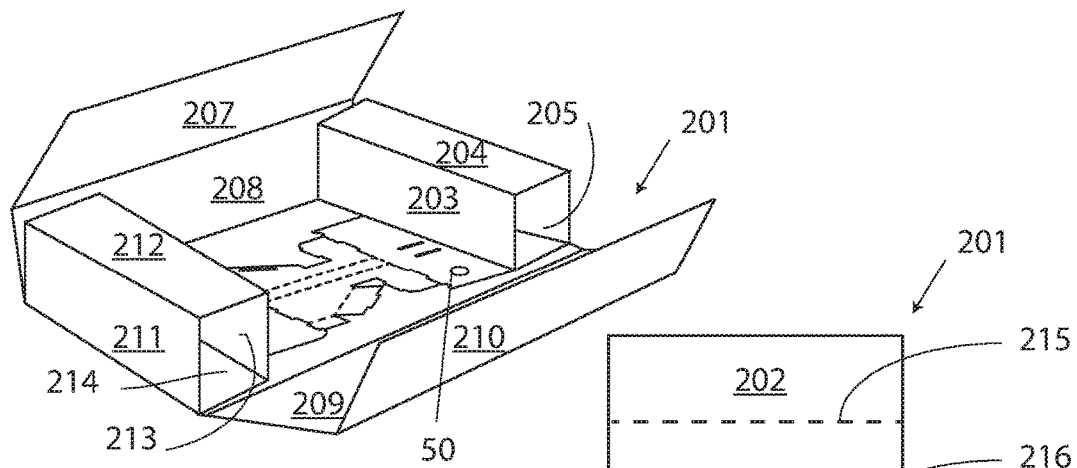
Figure 25:
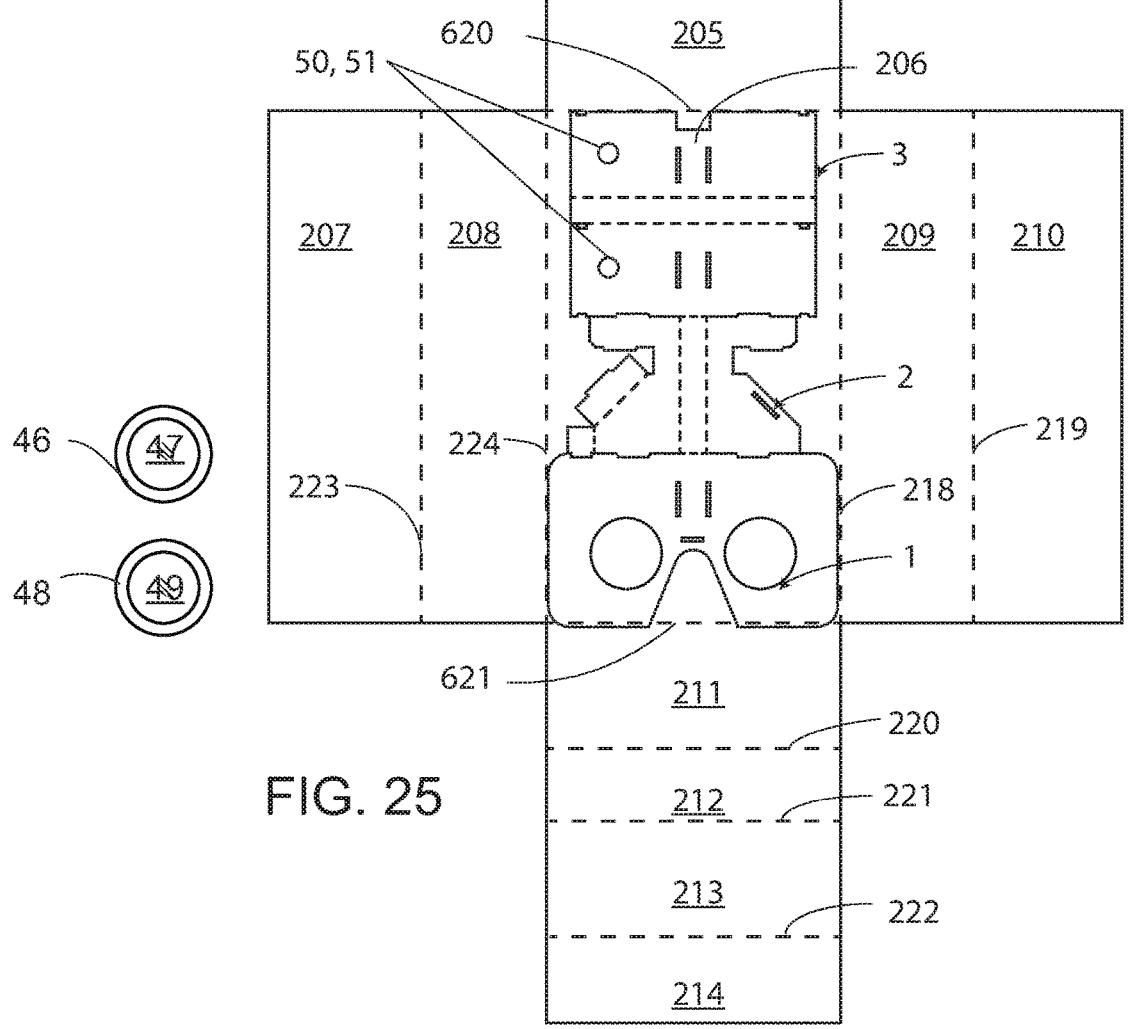
FIG. 25 displays a top-plan view of the seventh embodiment of the present invention on a one-piece folder package.

FIG. 25 shows the seventh embodiment of the present invention, the viewer incorporated into a one piece folder (201). Creases (215), (216), (217), (218), (219), (220), (221), (222), (223), (224), (620), and (621) are folded inward to form a one piece folder (201) with side compartment liners as shown in FIG. 24. The left side compartment liner is formed by panels (211), (212), (213), and (214) folded inward along creases (220), (221), and (222). Creases (215), (216), and (217) are folded to form the right side compartment liner with panels (202), (203), (204), and (205). The blank (201) is folded along bends (224) and (223) to form side wall (208) and top closure panel (207). The other half of the top closure panel (210) is bounded by fold lines (219) and connected to panel (209). Crease (218) is bended inward to form side wall (209). The pair of top closure panels (210) and (209) can be sealed closed with tape.

The detachable portion of invention, comprised of a face plate (1), spine (2), and back plate (3), is perforated on panel (206). A pair of biconvex lenses (47) and (49) with adhesives (46) and (48) is included with the package when distributed. The method of assembling the viewer is described in FIG. 1.

Figure 26:
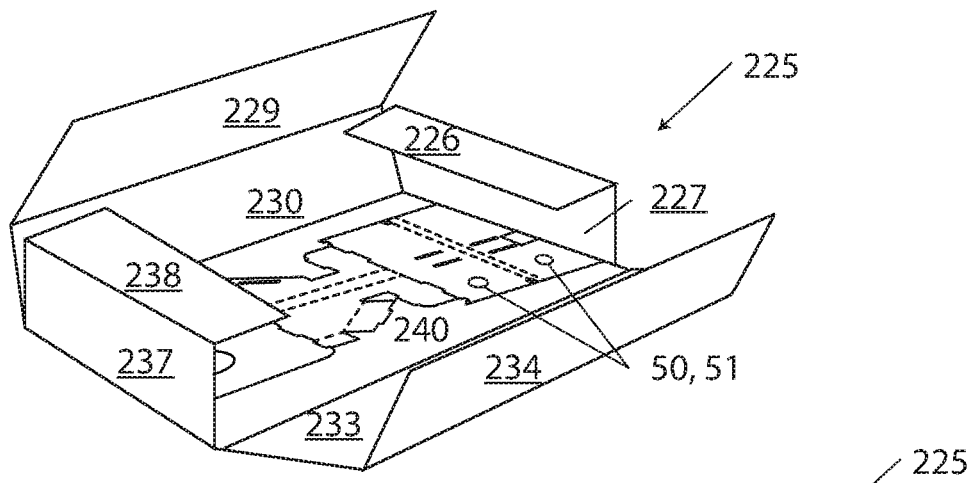
FIG. 26 exhibits an assembled view of the eighth embodiment of the present invention on an alternate one-piece folder package.
Figure 27:
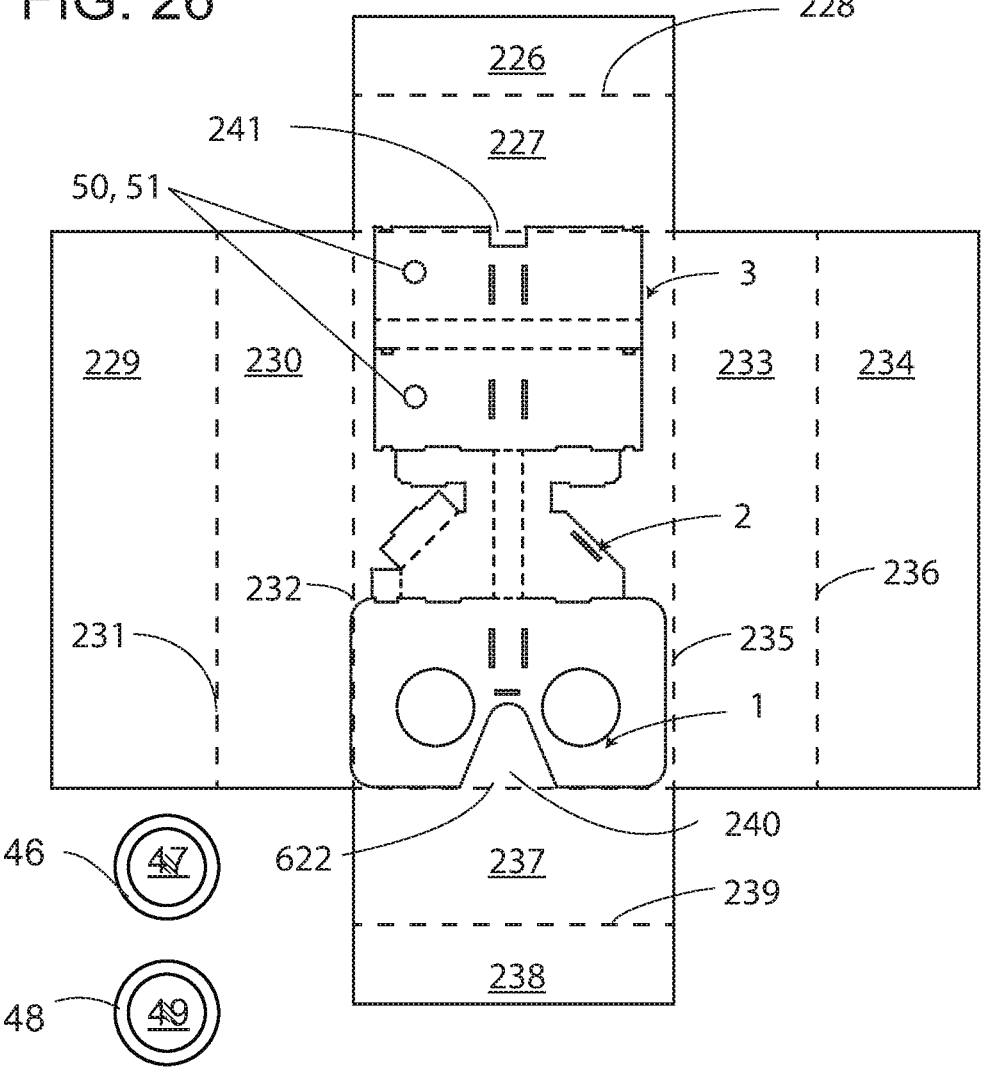
FIG. 27 displays a top-plan view of the eighth embodiment of the present invention on an alternate one-piece folder package.

FIG. 27 shows the eighth embodiment of the present invention, the viewer incorporated into an alternate one piece folder (225) with dust flaps (238) and (226). Creases (228), (241), (231), (232), (235), (236), (622), and (239) are folded inward to form a one piece folder package (225), bounded by right wall (237), left wall (227), front wall (233), back wall (230), top wall formed by panels (229) and (234) and bottom wall (240) as shown in FIG. 26. The top panels (229) and (234) can be sealed with tape to close box.

The detachable portion of invention, comprised of a face plate (1), spine (2), and back plate (3), is perforated on panel (240). A pair of biconvex lenses (47) and (49) with adhesives (46) and (48) is included with the package when distributed. The method of assembling the viewer is described in FIG. 1.

The ninth embodiment of the present invention, shown in FIGS. 29A and 29B, features the viewer integrated into a full-lid lift top/telescopic apparatus with an outer lid (242) and inner lid (243). In the outer lid (242), creases (253), (254), (255), and (256) are folded inward to form the box with top wall (259) and side walls (257), (258), (261), and (260). In the inner lid (243), creases (249), (252), (250), and (251) are folded inward to form the box with bottom wall (244), side walls (246), (245), (247), and (248). Corners are taped together. The assembled condition of this embodiment is shown in FIG. 28.

The detachable portion of invention, comprised of a face plate (1), spine (2), and back plate (3), is perforated on the outer lid (242) but can also be integrated in the inner lid. A pair of biconvex lenses (47) and (49) with adhesives (46) and (48) is included with the package when distributed. The method of assembling the viewer is described in FIG. 1.

The tenth embodiment of the present invention, shown in FIGS. 31 and 32, features the viewer integrated into a half lid lift top/telescopic apparatus with a top lid (262) and bottom lid (263). In the top lid (262), creases (280), (277), (278), and (279) are folded inward to form the box with top wall (281) and side walls (274), (273), (275), and (276). In the bottom lid (263), creases (265), (272), (270), and (269)

are folded inward to form the box with bottom wall (267) and side walls (264), (266), (271), and (268). Corners are taped together. The assembled condition of this embodiment is shown in FIG. 30.

The detachable portion of invention, comprised of a face plate (1), spine (2), and back plate (3), is perforated on the bottom lid (263). A pair of biconvex lenses (47) and (49) with adhesives (46) and (48) is included with the package when distributed. The method of assembling the viewer is described in FIG. 1.

The eleventh embodiment of the present invention, shown in FIGS. 34 and 35, features the viewer integrated into a sleeve (283) and tray (282) package. Creases (301), (302), (298), and (300) are folded inward to form the tray (282) with bottom wall (289) and side walls (288), (286), (290) and (292). Creases (303), (296), (304), (297), (295), and (299) are folded inward and secured by flaps (284) and (294). Adhesive is applied to interior side of flaps (284) and glued to panels (285) and (287) and to interior side of flaps (294) to attach to flaps (291) and (293). In the sleeve (283), creases (311), (309), (307), and (313) are folded inward to form the box with bottom wall (310), front wall (305), side walls (308) and (312). Adhesive is applied to the inner face of tab (306) and attach to interior side of panel (312) as shown in FIG. 33. The assembled condition of this embodiment is shown in FIG. 33.

Figure 37:
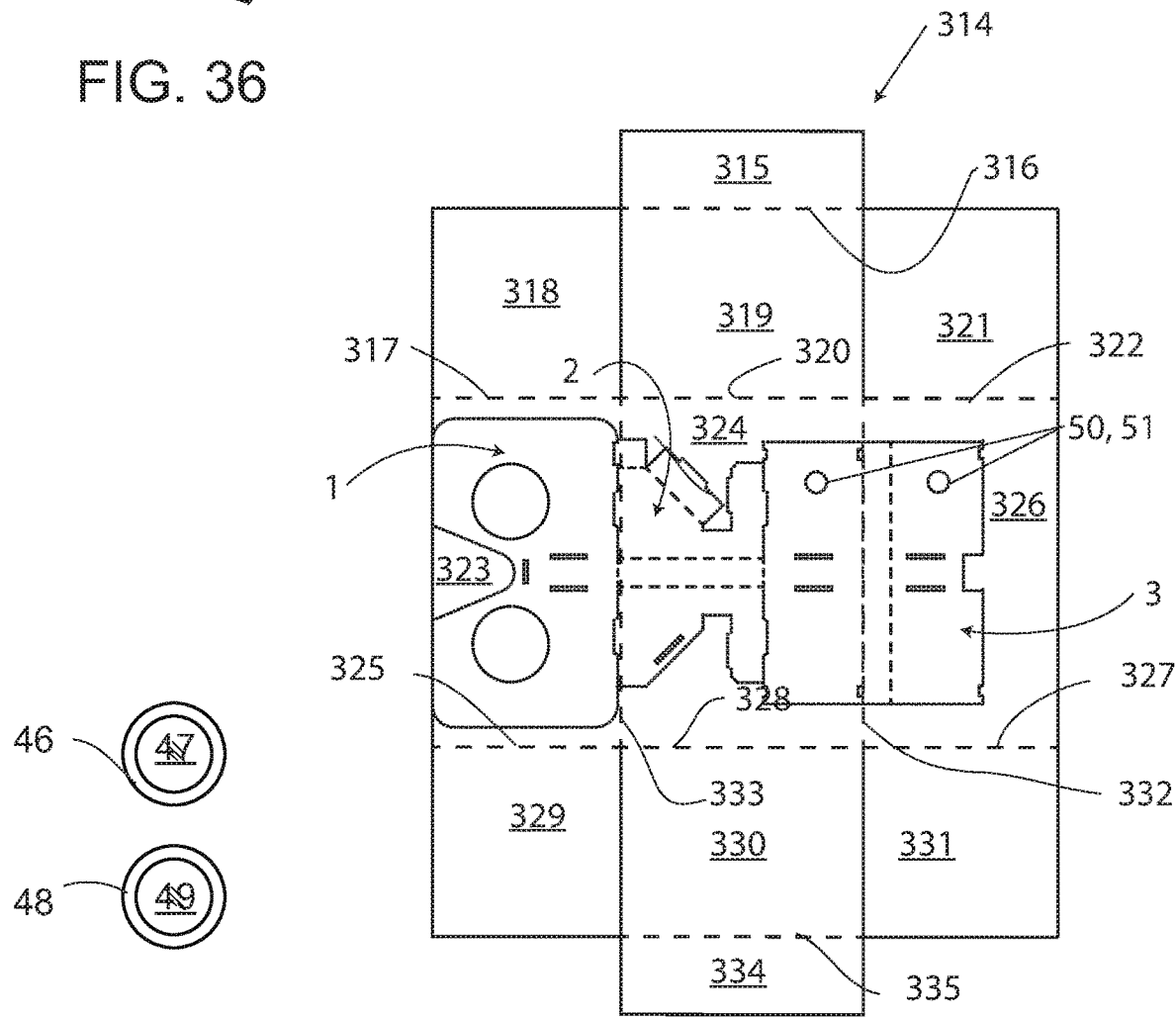
FIG. 37 displays a top-plan view of the twelfth embodiment of the present invention on a tray package.

The detachable portion of invention, comprised of a face plate (1), spine (2), and back plate (3), is perforated on the sleeve (283), but can be integrated as part of the tray as shown in FIG. 37. A pair of biconvex lenses (47) and (49) with adhesives (46) and (48) is included with the package when distributed. The method of assembling the viewer is described in FIG. 1.

Figure 36:
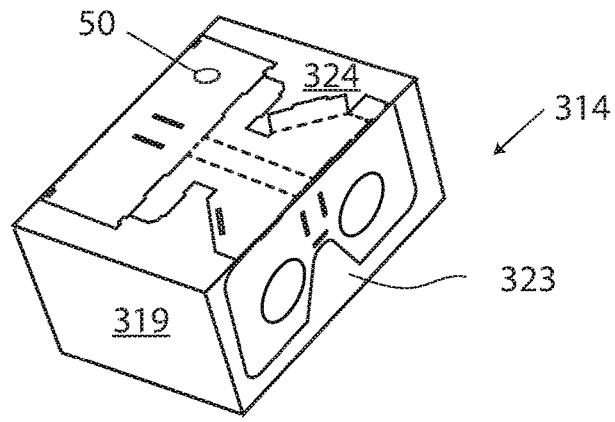
FIG. 36 exhibits an assembled view of the twelfth embodiment of the present invention on a tray package.

The twelfth embodiment of the present invention, shown in FIG. 37, features the viewer integrated into a tray (314) package. Creases (320), (328), (333), and (332) are folded inward to form the tray (314) with bottom wall (324) and side walls (323), (319), (326), and (330). Creases (317), (320), (322), (325), (328), (335), (316) and (327) are folded inward and secured by flaps (315) and (334). Adhesive is applied to interior side of flaps (315) and glued to panels (318) and (321) and to the interior side of flaps (334) to attach to flaps (329) and (331). The assembled condition of this embodiment is shown in FIG. 36.

The detachable portion of invention, comprised of a face plate (1), spine (2), and back plate (3), is perforated on the tray (314). A pair of biconvex lenses (47) and (49) with adhesives (46) and (48) is included with the package when distributed. The method of assembling the viewer is described in FIG. 1.

Figure 38:
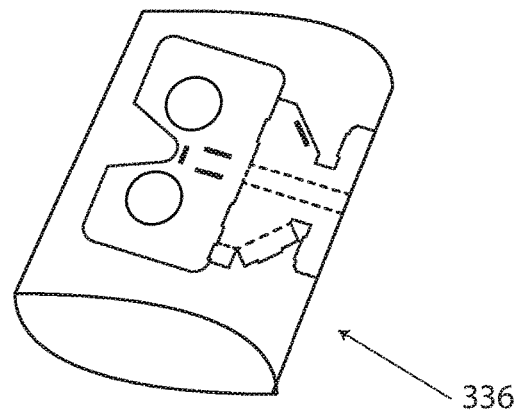
FIG. 38 exhibits an assembled view of the thirteenth embodiment of the present invention on a pillow pack package.
Figure 39:
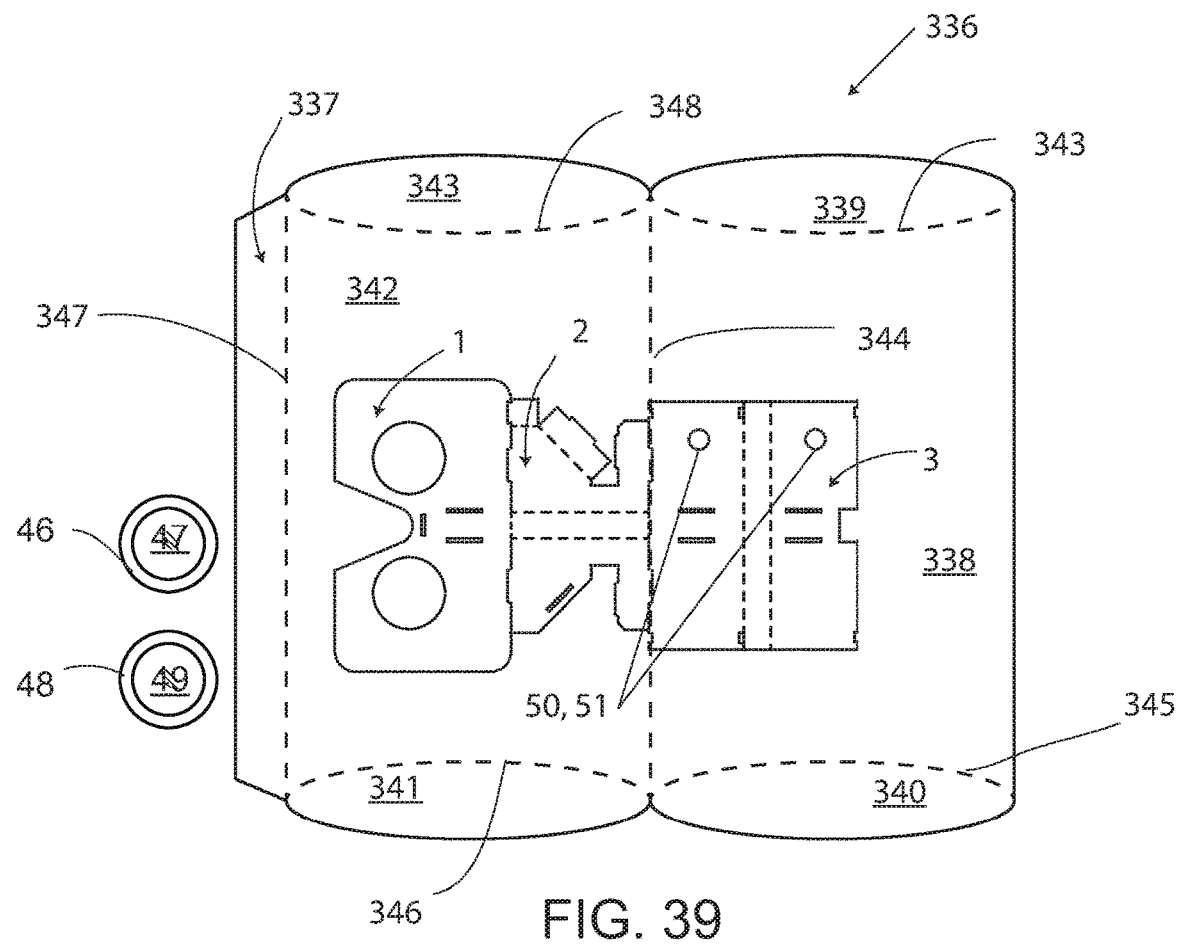
FIG. 39 displays a top-plan view of the thirteenth embodiment of the present invention on a pillow pack package.

FIG. 39 exhibits the thirteenth embodiment of the present invention with the viewer integrated into a pillow pack (336). Adhesive is applied to the tab (337) and attached to interior side of panel (338) along fold line (347), forming a cylindrical-shaped packaging. End flaps (343), (339), (341) and (340) are folded inward along creases (348), (343), (346), and (345) to enclose as shown in FIG. 38. The perforated area is preferably positioned on the packaging where fold line (344) matches bend between spine (2) and back plate (3) in this orientation.

Figure 40:
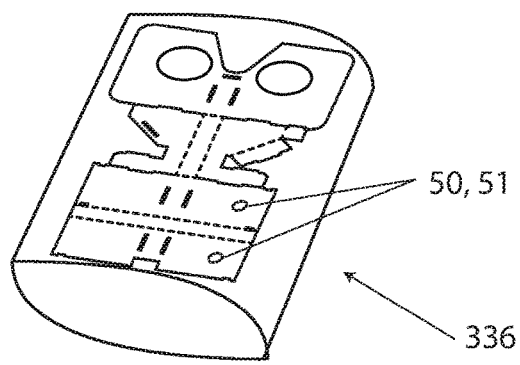
FIG. 40 exhibits an assembled view of the fourteenth embodiment of the present invention on an alternate pillow pack package.
Figure 41:
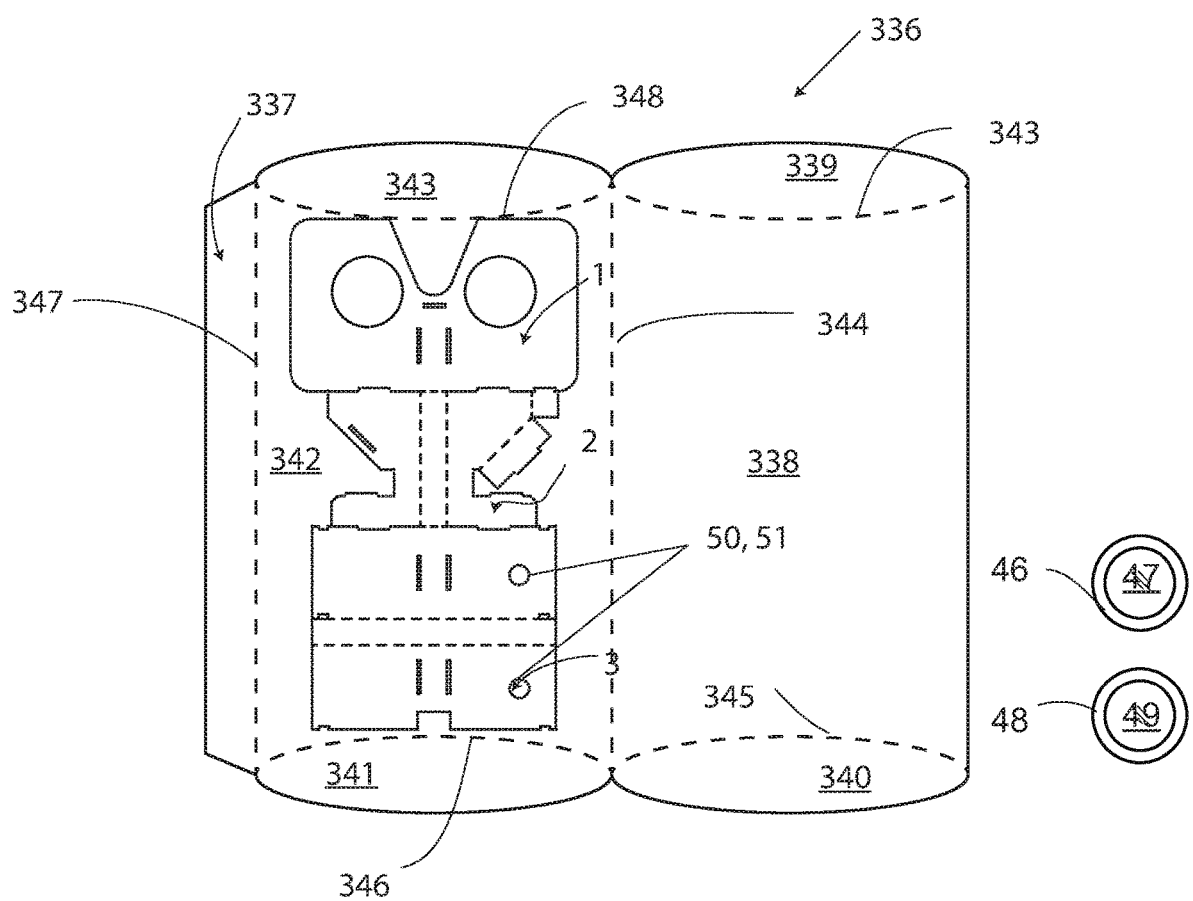
FIG. 41 displays a top-plan view of the fourteenth embodiment of the present invention on an alternate pillow pack package.

The detachable portion of invention, comprised of a face plate (1), spine (2), and back plate (3), is perforated on panels (342) and (338), but can be incorporated in the longitudinal direction as shown in FIGS. 40 and 41. A pair of biconvex lenses (47) and (49) with adhesives (46) and (48) is included with the package when distributed. The method of assembling the viewer is described in FIG. 1.

FIG. 41 shows the fourteenth embodiment of the present invention, the viewer incorporated into a pillow packaging with the detachable portion of the invention oriented in the longitudinal direction. The pillow pack is constructed in the same method as described in FIG. 39. In this case, the perforated area fits fully on panel (342).

A pair of biconvex lenses (47) and (49) with adhesives (46) and (48) is included with the package when distributed. The method of assembling the viewer is described in FIG. 1.

FIG. 43 exhibits the fifteenth embodiment of the present invention on an alternate regular slotted carton package (349). As shown in FIG. 42, creases (350), (358), (359), (356A), (357), (373), (355), (356B), (351), (352), (353), and (354) fold inwardly to form a box, bounded by a front wall (365), a left wall (368), a back wall (371), a right wall (362), a top wall formed by panels (367), (370), (364), and (361), and bottom wall formed by panels (363), (366), (369), and (372). Adhesive is applied to the inner face of panel (360) and attach to interior side of panel (371). The top wall and bottom wall are sealed close with tape.

The detachable portion of invention, comprised of a face plate (1), spine (2), and back plate (3), is perforated on panels (364), (365), and (366) in latitudinal direction. The viewer is preferably placed on the planar surface to match the folds of the packaging. A pair of biconvex lenses (47) and (49) with adhesives (46) and (48) is included with the package when distributed. The method of assembling the viewer is described in FIG. 1.

Figure 44:
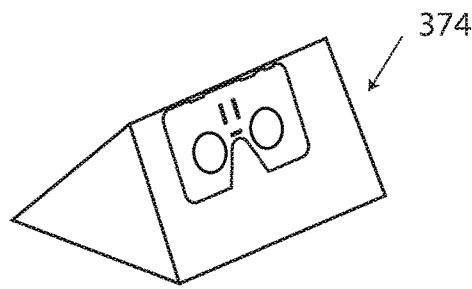
FIG. 44 exhibits an assembled view of the sixteenth embodiment of the present invention on a triangular package.
Figure 45:
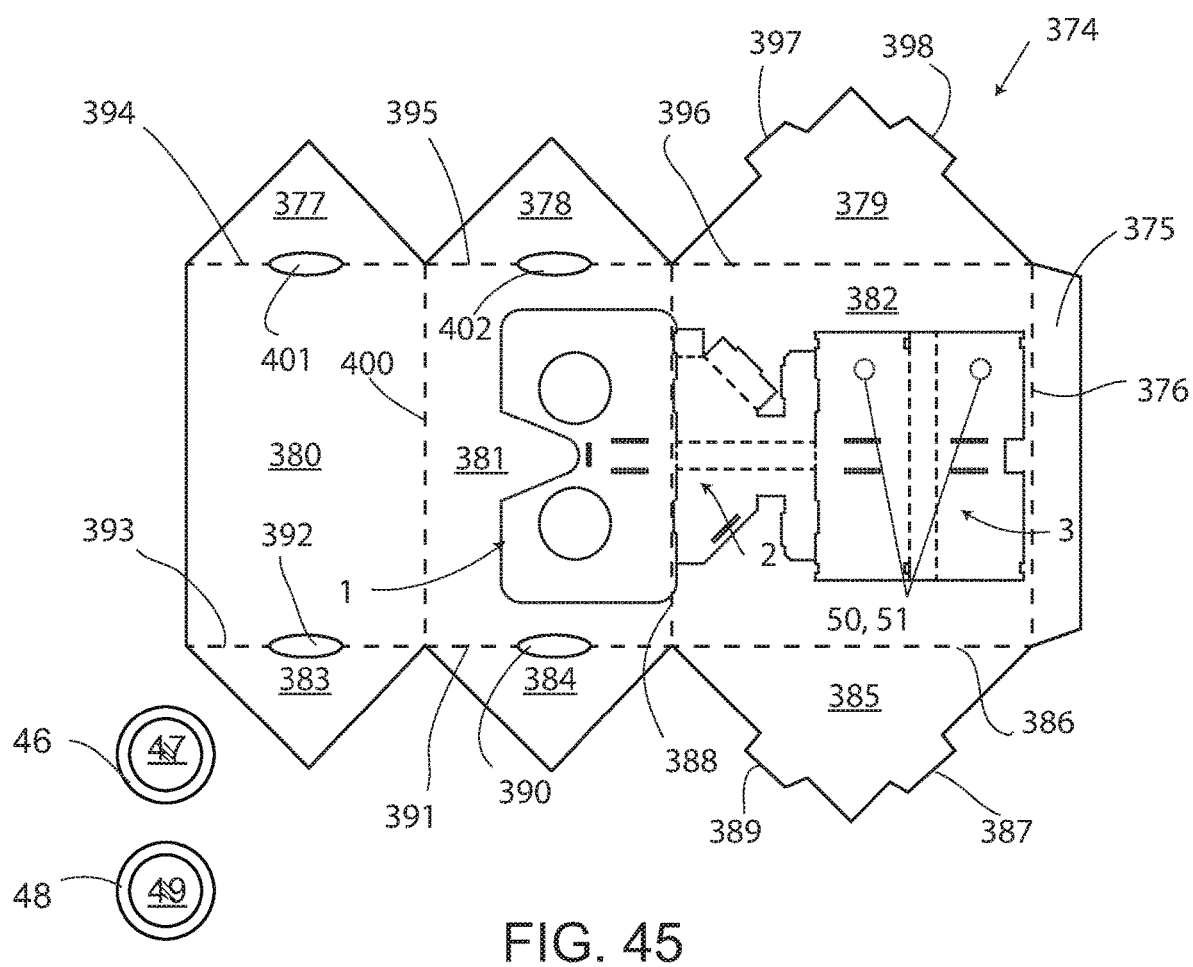
FIG. 45 displays a top-plan view of the sixteenth embodiment of the present invention on a triangular package.

The sixteenth embodiment of the present invention shows the viewer incorporated into a triangular packaging (374) as shown in FIG. 45. Creases (400), (388), (394), (395), (396), (393), (391), (376), and (386) fold inwardly to form a triangular box with side panels (380) and (381) and a bottom wall (382). Adhesive is applied to the face of panel (375) and attached to the interior side of panel (380). End flaps (377), (378), and (379) are folded along creases (394), (395), and (396) and secured in place by inserting taps (397) and (398) into slots (401) and (402). On the opposite end, flaps (383), (384), and (385) along fold lines (393), (391), and (386) are folded inward and held in place by tabs (389) and (387) into slots (392) and (390). The assembled state of the package is shown in FIG. 44.

The perforated area delineates the detachable portion of the invention, comprised of a face plate (1), spine (2), and back plate (3) and placed on panels (381) and (382). The viewer is preferably placed on the planar surface to match the bends of the package. A pair of biconvex lenses (47) and (49) with adhesives (46) and (48) is included with the package when distributed. The method of assembling the viewer is described in FIG. 1.

Figure 46:
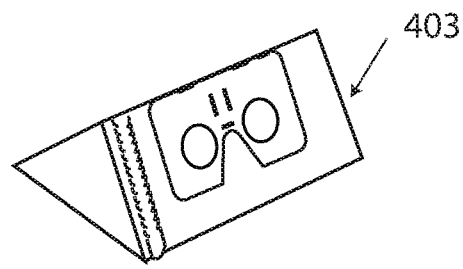
FIG. 46 exhibits an assembled view of the seventeenth embodiment of the present invention on an alternate triangular package with a tear away zipper.
Figure 47:
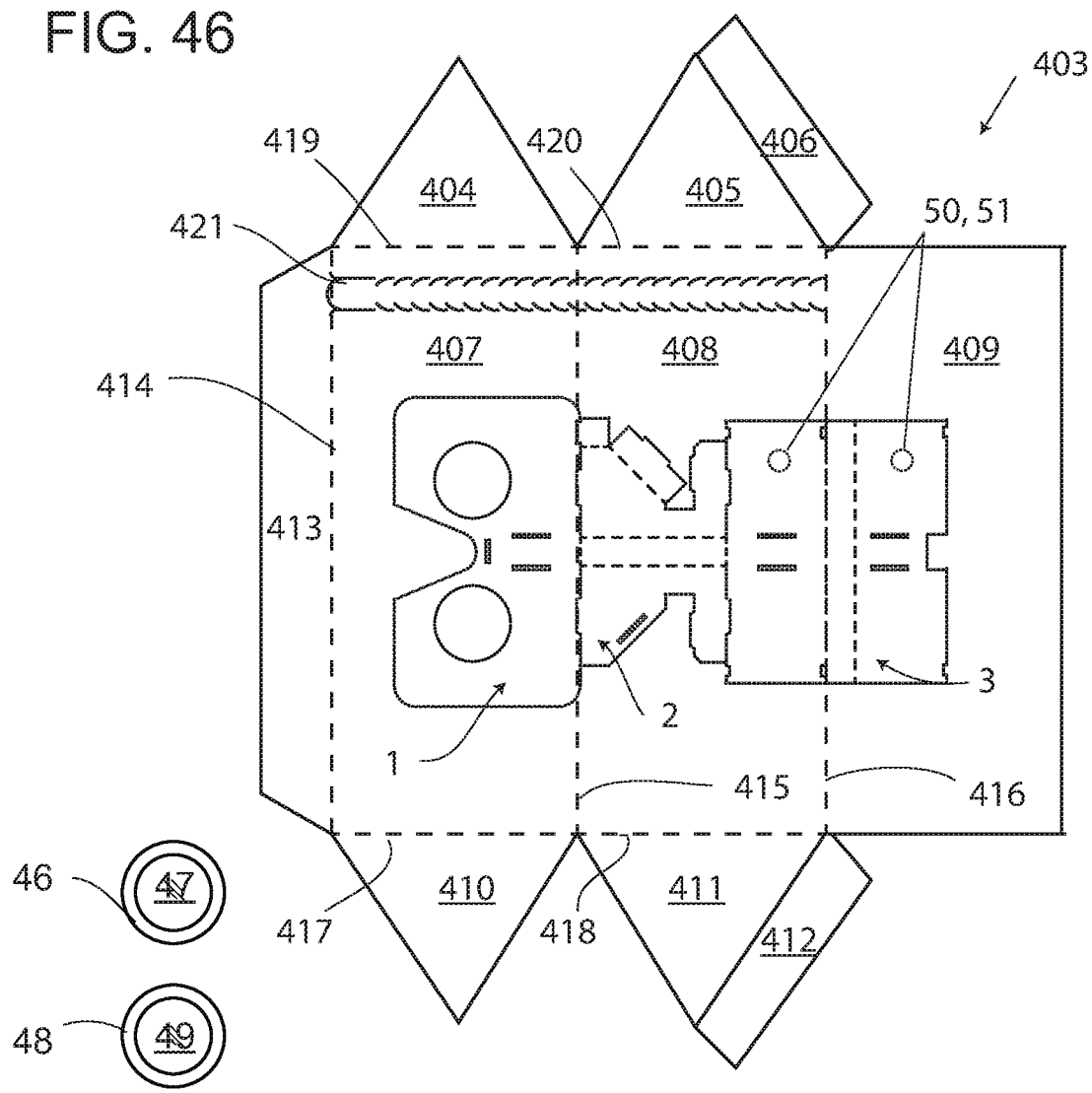
FIG. 47 displays a top-plan view of the seventeenth embodiment of the present invention on an alternate triangular package with a tear away zipper.

The seventeenth embodiment of the present invention shows the viewer incorporated into an alternate triangular packaging (403) as shown in FIG. 47. Creases (419), (420), (414), (415), (416), (417), and (418) fold inwardly to form a triangular box with side panels (408) and (307) and a bottom wall (409). Adhesive is applied to the face of panel (413) and glued to the interior side of panel (409). End flaps (404) and (405) are folded along creases (419) and (420). On the other end, flaps (410) and (411) fold inward along creases (417) and (418). Adhesive is applied to tabs (406) and (412) and attached to ends of panel (409). The assembled state of the package is shown in FIG. 46. A tear away strip (421) runs across panels (407) and (408) for easy opening.

The perforated area delineates the detachable portion of the invention, comprised of a face plate (1), spine (2), and back plate (3) and placed on panels (407), (408), and (409).

The viewer is preferably placed on the planar surface to match the bends of the package. A pair of biconvex lenses (47) and (49) with adhesives (46) and (48) is included with the package when distributed. The method of assembling the viewer is described in FIG. 1.

The eighteenth embodiment of the present invention illustrates the viewer on a one piece collapsible tray with lid (422), similar to a pizza box, as shown in FIG. 49. Creases (441), (442), (445), and (440) fold inwardly to form the tray with side panels (432), (430), (428), and (434) and bottom wall (431). Fold lines (438), (439), (437), and (436) and panels (424), (426), (423), and (425) form a lid to cover the tray. Tabs (433), (435), (427), and (429) defined by creases (399, 443, 444, 549) rest between the lid and tray to seal the corners of tray as shown in FIG. 48.

The detachable portion of the present invention, comprised of a face plate (1), spine (2), and back plate (3), is perforated on the panel (425). A pair of biconvex lenses (47) and (49) with adhesives (46) and (48) is included with the package when distributed. The method of assembling the viewer is described in FIG. 1.

Figure 50:
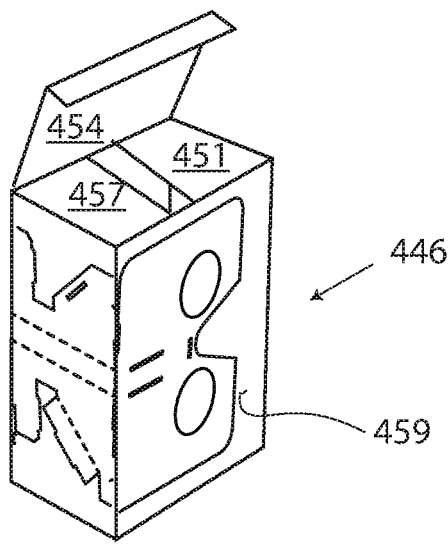
FIG. 50 exhibits an assembled view of the nineteenth embodiment of the present invention on a reverse tuck package.
Figure 51:
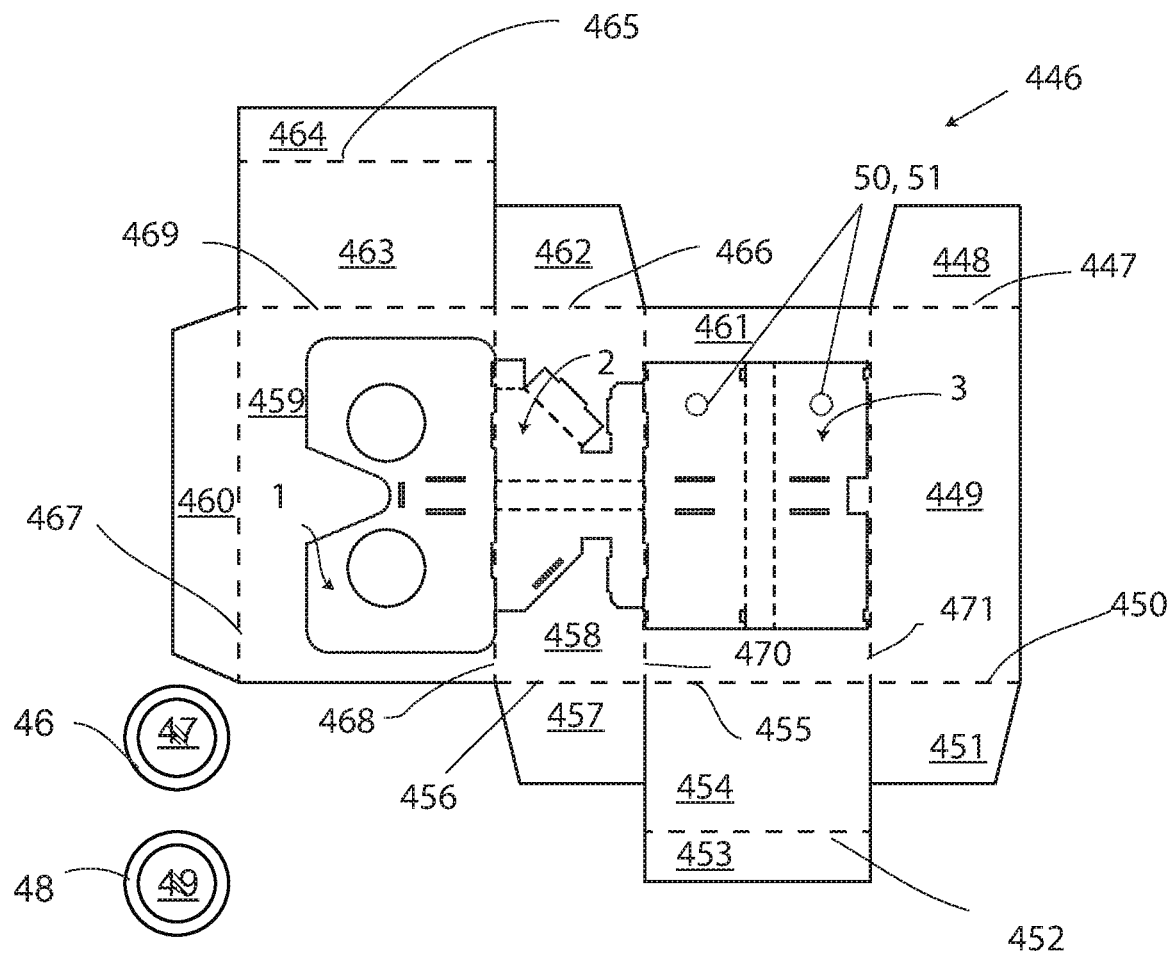
FIG. 51 displays a top-plan view of the nineteenth embodiment of the present invention on a reverse tuck package.

The nineteenth embodiment of the present invention exhibits the viewer on a reverse tuck packaging (446), as shown in FIG. 51. Creases (456), (455), (450), (469), (466), (447), (468), (470), (471), and (467) fold inwardly to form the back panel (459), side panels (458) and (449), and front panel (461) of the box. Adhesive is applied to the glue lap (460) and attach to the underside of panel (449). Dust flaps (457) and (451) are tucked inside the bottom flap (454) and locked with tab (453) defined by crease (452). Top panel (463) with upper tuck (464) defined by crease (465) covers over dust flaps (462) and (448) to close box. The apparatus in its assembled view is shown in FIG. 50.

The detachable portion of invention, comprised of a face plate (1), spine (2), and back plate (3), is perforated on the back panel (459), side panel (458), and front face (461). A pair of biconvex lenses (47) and (49) with adhesives (46) and (48) is included with the package when distributed. The method of assembling the viewer is described in FIG. 1.

The twentieth embodiment of the present invention exhibits the viewer on a straight tuck packaging (469), as shown in FIG. 53. Creases (485), (486), (487), (488), (489), (480), (466), (477), (491), and (492) fold inwardly to form the back panel (476), side panels (474) and (478), and front panel (475) of the box. Adhesive is applied to the glue lap (493) and attach to the underside of panel (476). Dust flaps (479) and (481) are tucked inside the bottom flap (482) and locked with tab (483) defined by crease (490). Top panel (472) with upper tuck (470) defined by crease (484) covers over dust flaps (471) and (473) to close box. The apparatus in its assembled view is shown in FIG. 52.

The detachable portion of invention, comprised of a face plate (1), spine (2), and back plate (3), is perforated on the back panel (476), side panel (478), and front face (475). A pair of biconvex lenses (47) and (49) with adhesives (46) and (48) is included with the package when distributed. The method of assembling the viewer is described in FIG. 1.

Figure 54:
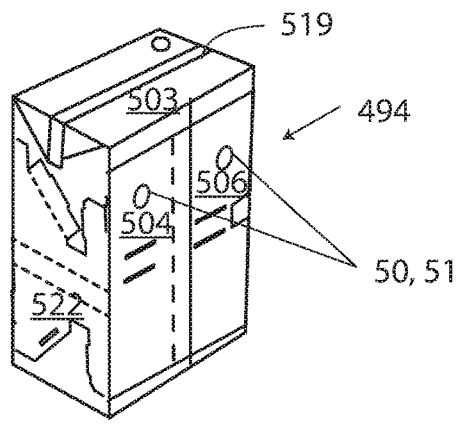
FIG. 54 exhibits an assembled view of the twenty-first embodiment of the present invention on an aseptic package.
Figure 55:
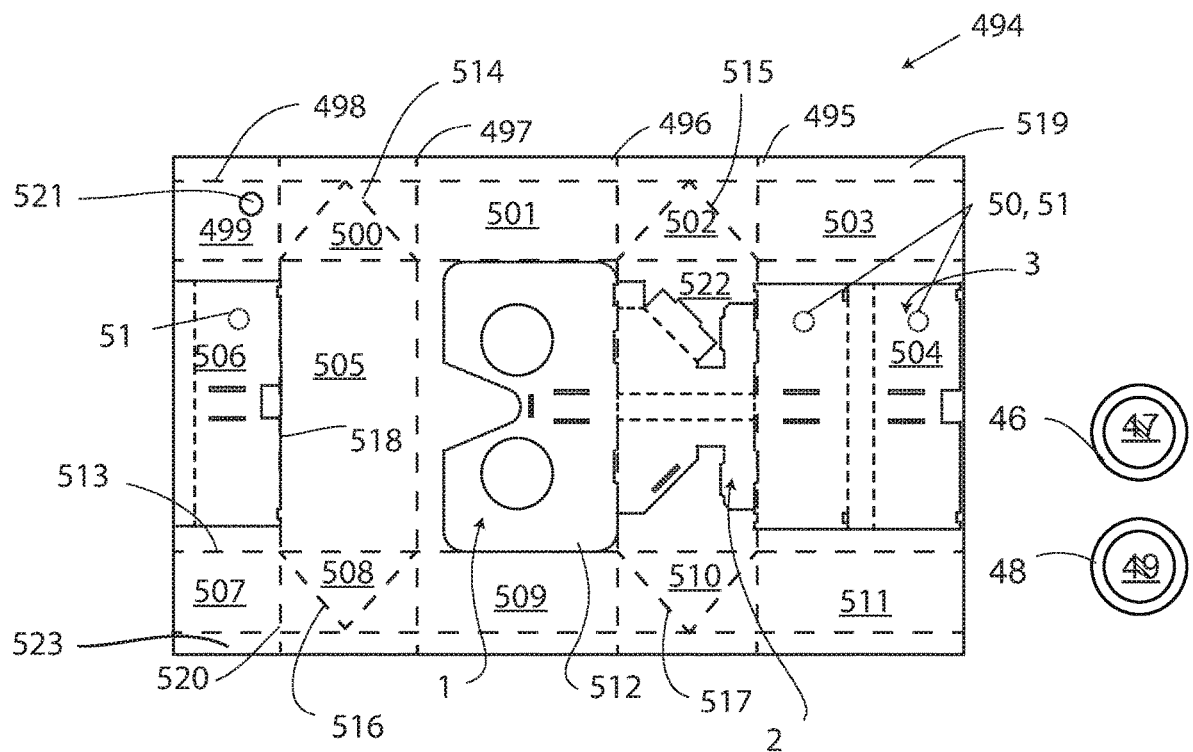
FIG. 55 displays a top-plan view of the twenty-first embodiment of the present invention on an aseptic package.

The twenty-first embodiment of the present invention display viewer incorporated into an aseptic package (494), similar to a conventional juice box, as shown in FIG. 55. Creases (513), (498), (520), (518), (497), (496), and (495) fold inwardly to form the top panels (499), (500), (501), (502), and (503), bottom panels (507), (508), (509), (510), and (511), back panel (512), side panels (505) and (522), and front panel (504) of the box. The glue lap (506) is attached to the exterior side of panel (504) with adhesive, matching the perforations on panel (504). Flaps (519) and (523) along the perimeter of the blank are fully sealed to hold liquid contents. The interior side of blank may be reinforced with food-safe water-resistant coating. Creases (514), (515), (516), and (517) are folded in a triangular pattern at each respective ends and attached to the side panels (505) and (522) with adhesive, forming a flat surface at the ends. A protective cover over slot (521) can easily poke through with a straw. The apparatus in its assembled view is shown in FIG. 54.

The detachable portion of invention, comprised of a face plate (1), spine (2), and back plate (3), is perforated on panels (504), (522), and (512). The overlap of panel (506) matches the perforations on panel (504) for ease of detachment. A pair of biconvex lenses (47) and (49) with adhesives (46) and (48) is included with the package when distributed. The method of assembling the viewer is described in FIG. 1.

Figure 56:
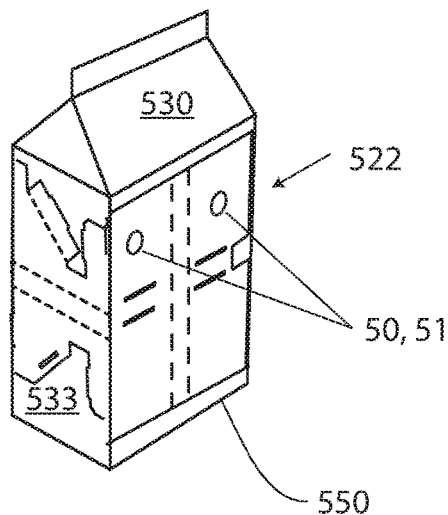
FIG. 56 exhibits an assembled view of the twenty-second embodiment of the present invention on a carton container.
Figure 57:
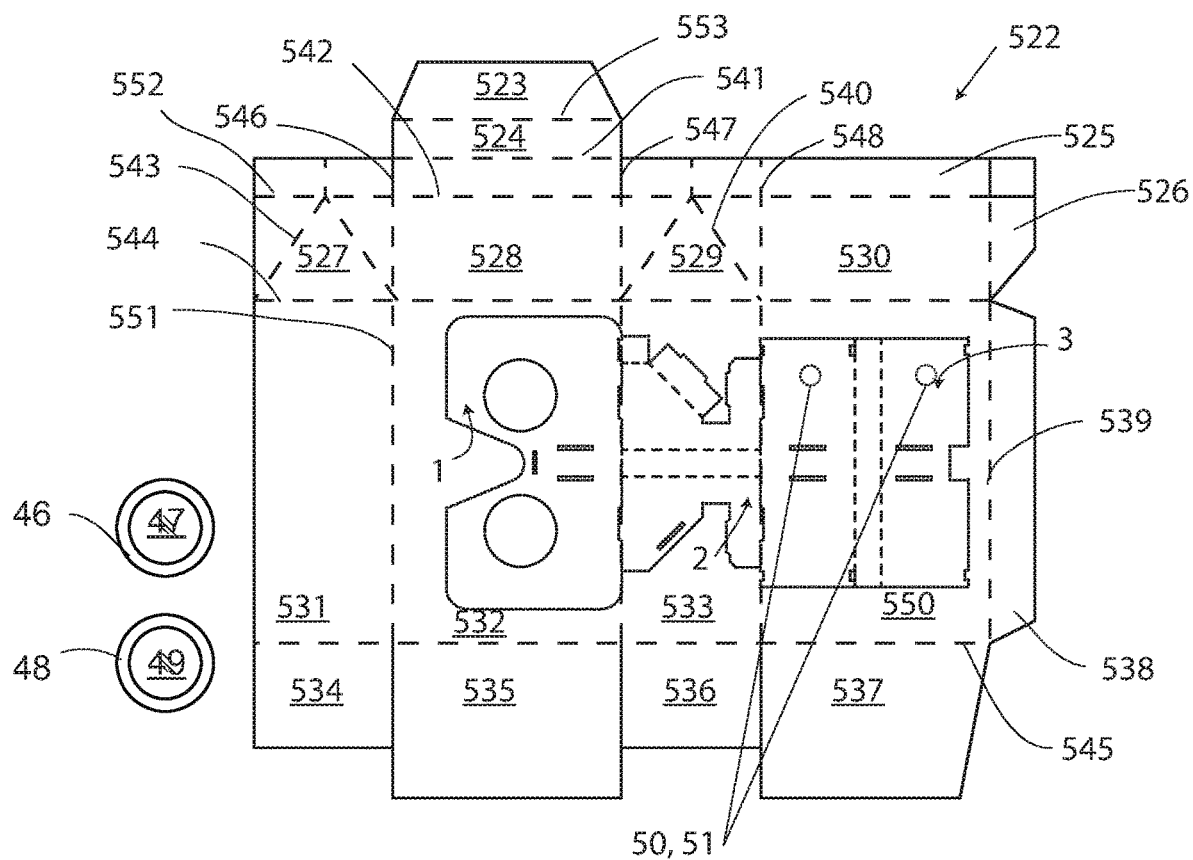
FIG. 57 displays a top-plan view of the twenty-second embodiment of the present invention on a carton container.

The twenty-second embodiment of the present invention illustrates the viewer on alternate aseptic carton container (522), similar to a milk carton, as shown in FIG. 57. Creases (542), (551), (544), (546), (541), (547), (548), (539), and (545) fold inwardly to form a box, defined by front panel (532), back panel (550), and side panels (533) and (531). Tabs (526) and (538) are attached to interior side of panel (531) and (527) with food-safe adhesive. Tabs (534), (535), and (536), and (537) overlap to form to the bottom wall. Part of panel (524) inserted between tab (525) and sealed close along edge of fold line (552). Creases (543) and (540) are folded into triangular pattern at each respective ends, forming a gable top (528, 529, 530, 527). Pull tab (523) extends from gable top along the edge of fold line (553) for easy carry. The apparatus in its assembled view is shown in FIG. 56.

The detachable portion of invention, comprised of a face plate (1), spine (2), and back plate (3), is perforated on panels (532), (533), and (550). A pair of biconvex lenses (47) and (49) with adhesives (46) and (48) is included with the package when distributed. The method of assembling the viewer is described in FIG. 1.

Figures 58, 59:
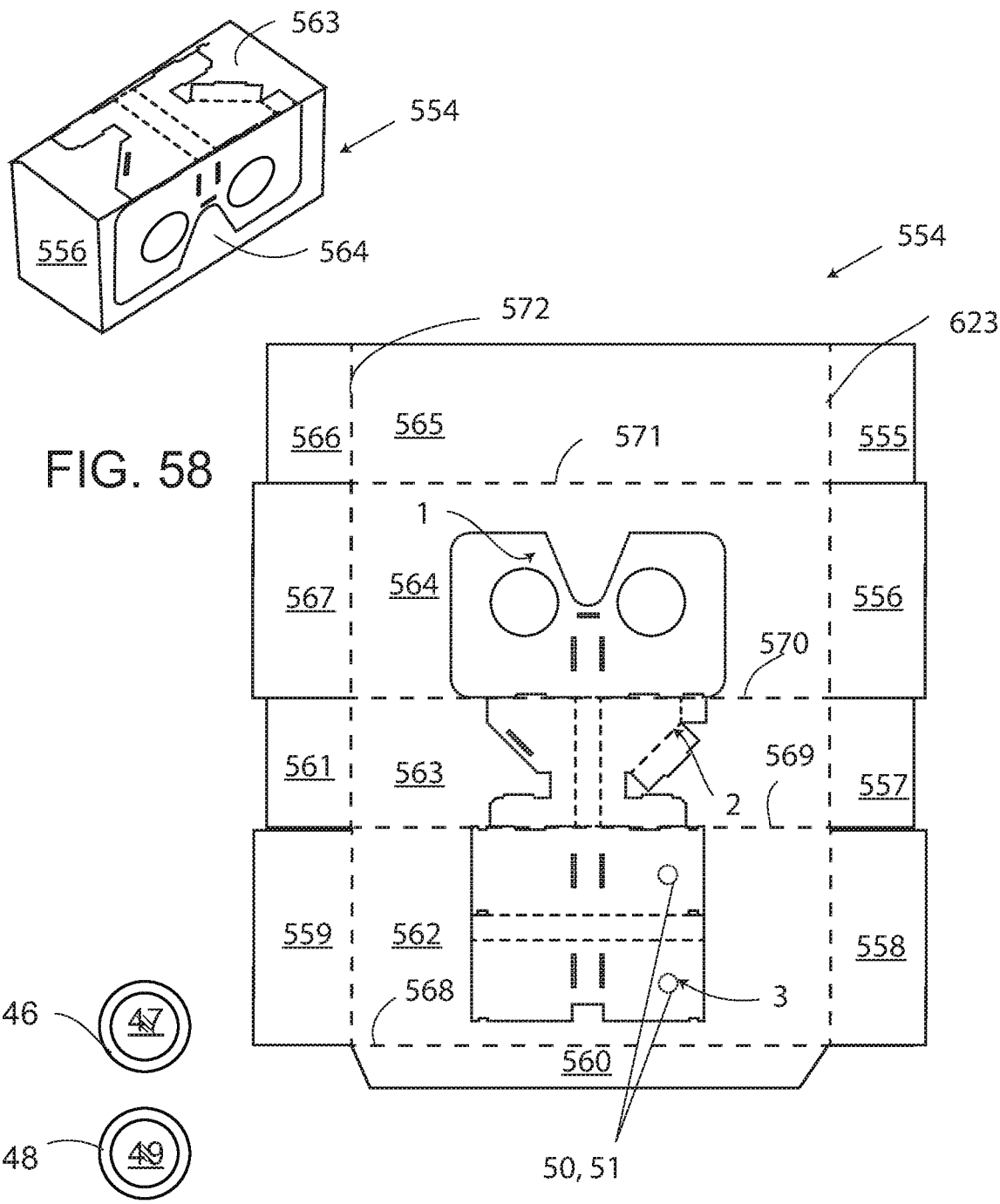
FIG. 58 exhibits an assembled view of the twenty-third embodiment of the present invention on a sealed end with perforated lid shaped like the face plate.
FIG. 59 displays a top-plan view of the twenty-third embodiment of the present invention on a sealed end with perforated lid shaped like the face plate.

The twenty-third embodiment of the present invention illustrates the viewer on a sealed end with perforated lid shaped like the face plate (554), similar to a tissue box, as shown in FIG. 59. Creases (568), (569), (570), and (571) fold inwardly to form a box, bounded by side panels (563) and (565), bottom panel (562), and top panel (564). On one end, side flaps (566) and (561) fold inward along crease (572). Flap (559) overlaps flap (567) and sealed by adhesive. Side flaps (555) and (557) fold inward along crease (623). Flap (558) overlaps flap (556) and sealed by adhesive. Adhesive is applied to the glue lap (560) and attached to the underside of panel (565). The perforated lid shaped like the face plate is located on panel (564) as shown in FIG. 58.

The detachable portion of invention, comprised of a face plate (1), spine (2), and back plate (3), is perforated on the panels (564), (563), and (562). A pair of biconvex lenses (47) and (49) with adhesives (46) and (48) is included with the package when distributed. The method of assembling the viewer is described in FIG. 1.

Figure 60:
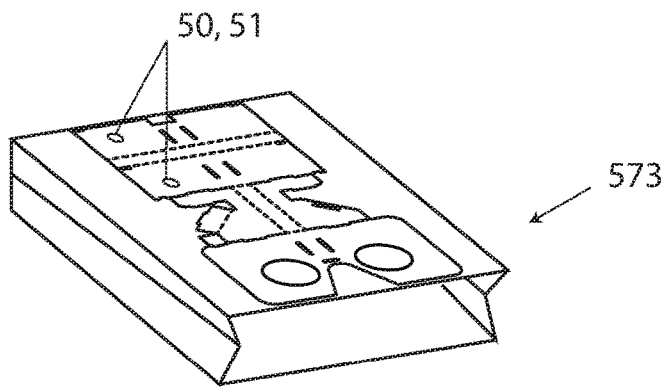
FIG. 60 exhibits an assembled view of the twenty-fourth embodiment of the present invention on a flat bottom grocery bag.
Figure 61:
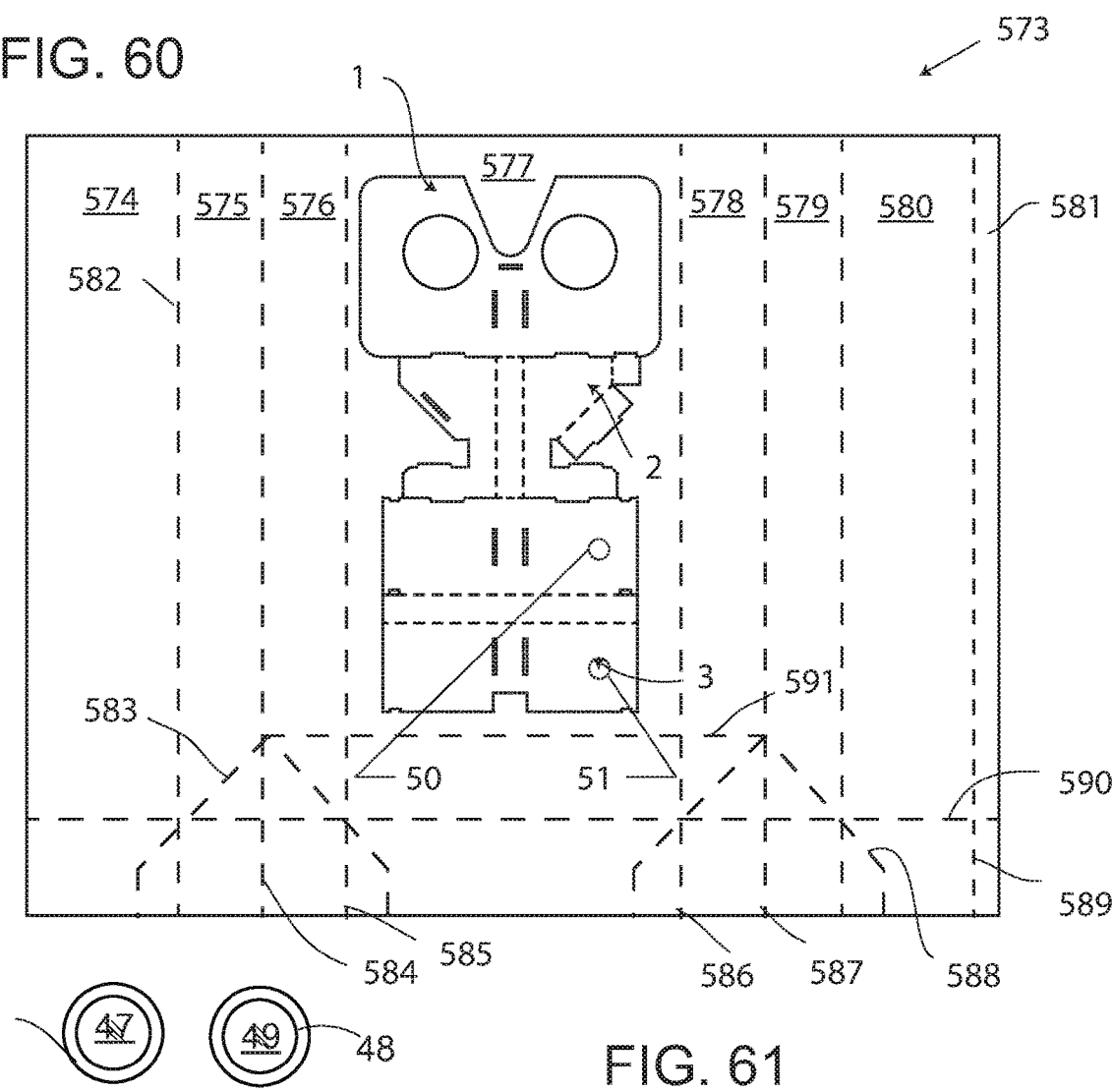
FIG. 61 displays a top-plan view of the twenty-fourth embodiment of the present invention on a flat bottom grocery bag.

The twenty-fourth embodiment of the present invention exhibits a flat bottom grocery bag (573) as shown in FIG. 61. Formed from conventional construction, the bag is spaced at intervals defined by fold lines (582), (584), (585), (586), (587), (588), and (589) to construct a front panel (577), pleated side panels (575), (576), (578), and (579), and back panel formed by overlapping panel (574) to (580). Tab (581) is pasted to the interior side of panel (574). The bottom end wall is creased to define fold lines (591), (590), (583), and (588) and permit panels (574), (577), and (580) to bellows-fold into a flat and compact form as shown in FIG. 60.

The detachable portion of invention, comprised of a face plate (1), spine (2), and back plate (3), is perforated on front panel (577), but can also be integrated on other planar surface. In that case, the viewer should be orientated so that it conforms to the folds of the packaging. A pair of biconvex lenses (47) and (49) with adhesives (46) and (48) is included with the package when distributed. The method of assembling the viewer is described in FIG. 1.

Figure 62:
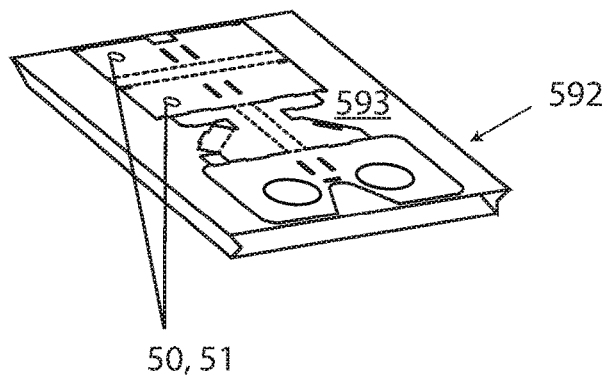
FIG. 62 exhibits an assembled view of the twenty-fifth embodiment of the present invention on an alternate grocery bag.
Figure 63:
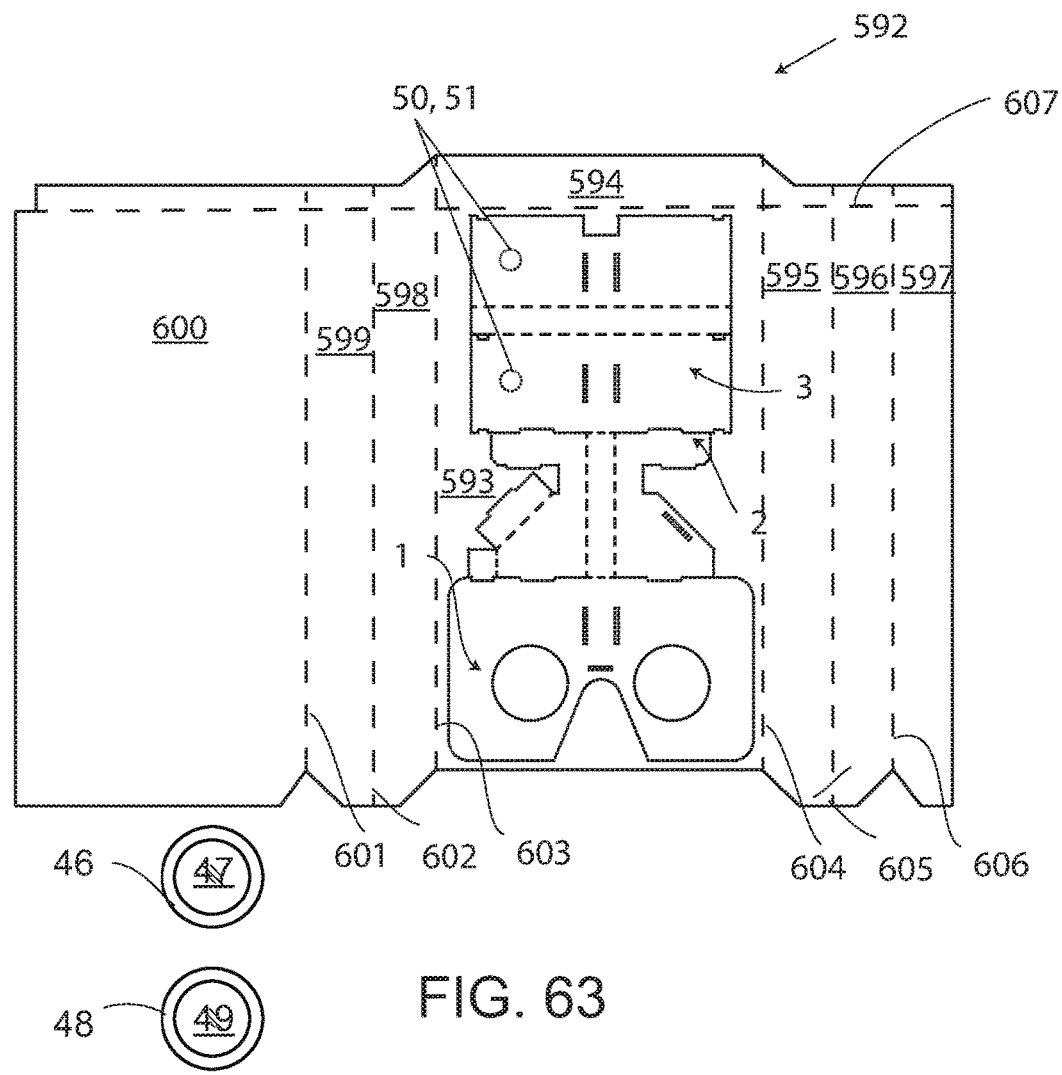
FIG. 63 displays a top-plan view of the twenty-fifth embodiment of the present invention on an alternate grocery bag.
Figure 64:
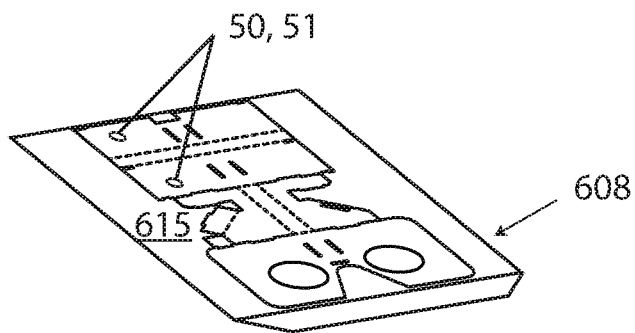
FIG. 64 exhibits an assembled view of the twenty-sixth embodiment of the present invention on a sealable folder with expandable sides.

The twenty-fifth embodiment of the present invention illustrate an alternate grocery bag (592) as shown in FIG. 63. Formed from conventional construction, the bag is spaced at pleated intervals defined by fold lines (601), (602), (603), (604), (605), (606), and (607) to construct a front panel (593), pleated side panels (599), (598), (595), (597) and (596), and back panel (600). Pleat (597) overlaps panel (600) and attached by adhesive. The bottom end tab (594) is creased along fold line (607). The defined fold lines (601), (602), (603), (604), (605), (606), and (607) permit panel (599), (598), (595), (597) and (596) to bellows-fold into a flat and compact form as shown in FIG. 62

The detachable portion of invention, comprised of a face plate (1), spine (2), and back plate (3), is perforated on front panel (593), but can also be integrated on other planar surface. In that case, the viewer should be orientated so that it conforms to the folds of the packaging. A pair of biconvex lenses (47) and (49) with adhesives (46) and (48) is included with the package when distributed. The method of assembling the viewer is described in FIG. 1.

Figure 65:
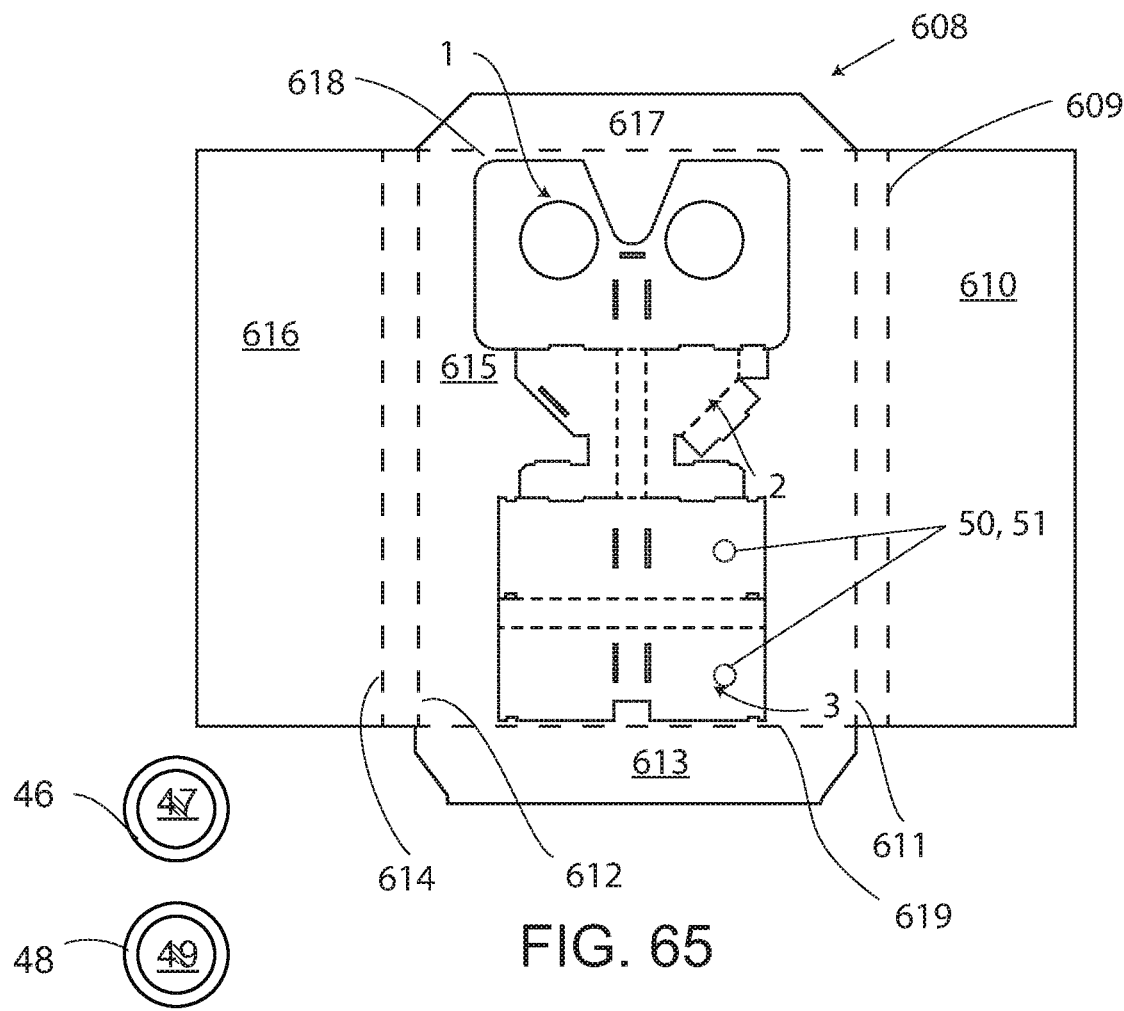
FIG. 65 displays a top-plan view of the twenty-sixth embodiment of the present invention on a sealable folder with expandable sides.
Figure 66:
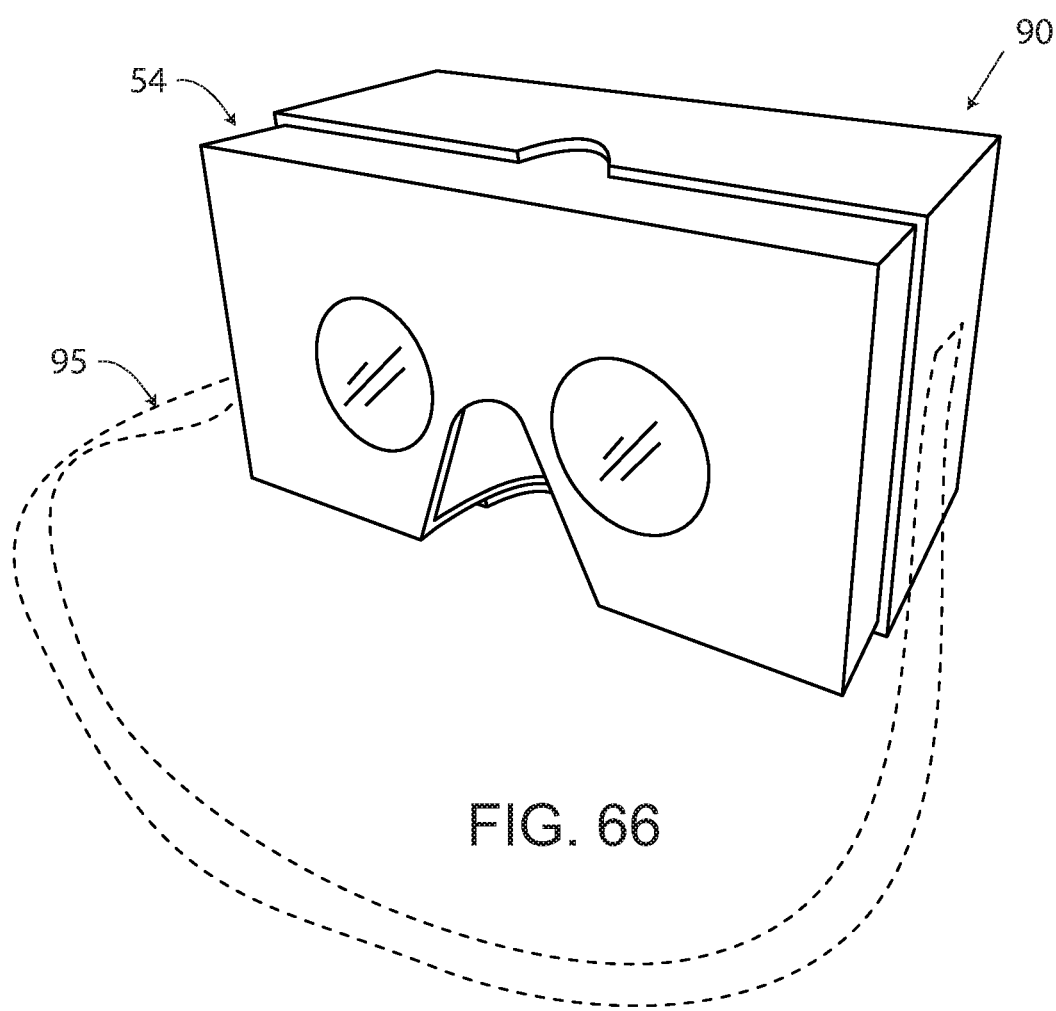
FIG. 66 exhibits a perspective view of the twenty-seventh preferred embodiment as shown in the fully assembled condition with straps.

The twenty-sixth embodiment of the present invention exhibits a sealable folder with expandable sides (608) as shown in FIG. 65. The envelope (608) is bounded by fold lines (618), (614), (612), (619), (611), and (609) to form front panel (615), a reclosable tab (617), and back panels (616) and (610). Panel (616) overlaps panel (610) and attached by adhesive. The bottom tab (613) creases along fold line (619) and pasted with back panel. Envelope can expand to the width of fold lines (614) and (612).

The detachable portion of invention, comprised of a face plate (1), spine (2), and back plate (3), is perforated on planar surface (615). A pair of biconvex lenses (47) and (49) with adhesives (46) and (48) is included with the package when distributed. The method of assembling the viewer is described in FIG. 1.

The twenty-seventh preferred embodiment of the present invention features alternative convertible viewer, comprised of a face plate unit (91), and a combination of frame and back plate unit (92).

Figure 67:
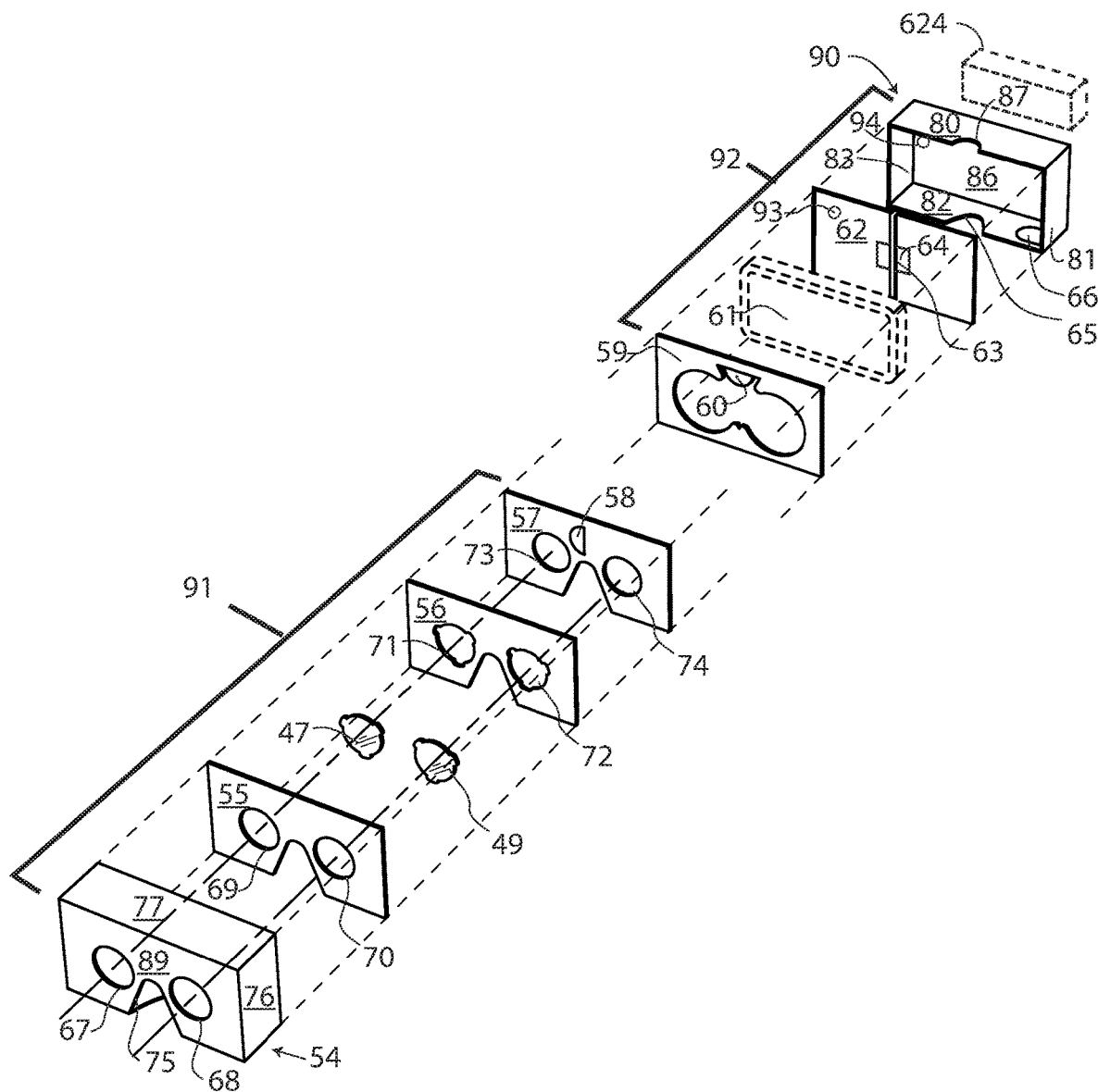
FIG. 67 shows an exploded perspective view of the twenty-seventh preferred embodiment of the present invention.

This twenty-seventh embodiment of the present invention, shown in FIG. 66, features a box-type apparatus with an outer lid (90) and inner lid (54) that can be converted into a virtual reality viewer for the smart device (61). In this variation, the viewer comes partially assembled. As shown in FIG. 66 and FIG. 67, users detach perforated slot (67) and perforated slot (68) for lenses, slot (65) and slot (75) for nose, and slot (66) to access to the device (61) screen.

FIG. 67 illustrates the component of the twenty-seventh preferred embodiment. To assemble the face plate unit (91), the lenses (47) and (49), resting securely in slots (71) and slot (72) of panel (56), are preferably fastened between the panels (55-57) by adhesives. The opposing side of panel (55) is attached to the interior side of the inner lid (54). Slots (69-74) are preferably centered with slot (67) and slot (68) for unobstructed viewing.

The combination of frame and back plate unit (92) of this alternate embodiment of the present invention is preferably comprised of a panel (62) attached to panel (86). The smart device (61) is preferably attached to the panel (62) via an elastic or rubber band (63). For additional reinforcement, a micro suction pad (64) may be employed to attach the device to the panel (62). Panel (59) is placed on top of the smart device by the user prior to inserting the face plate unit (91). Pull tabs (58) and (60) make it easier to separate the compartments and remove the phone from viewer. Slot (93) and slot (94) allow for the use of the camera of the device (61) while the device (61) is inside of the viewer.

To assemble the viewer for hands-free use as shown in FIG. 66, the head straps (95) are preferably secured to panel (81) and panel (83) with Velcro™ strips, micro suction pad, hooks, 3M™ Dual Lock™ reclosable fasteners, magnets, and/or other conventional attachment means.

The user can also attach a haptic device (624) or motion sensor to the front cover (86) of the viewer housing with Velcro™ strips, micro suction pad, hooks, 3M™ Dual Lock™ reclosable fasteners, magnets, and/or a conventional attachment mechanism, to a slit opening to facilitate remote control operation of the VR software application on the smart device (61).

Figure 68:
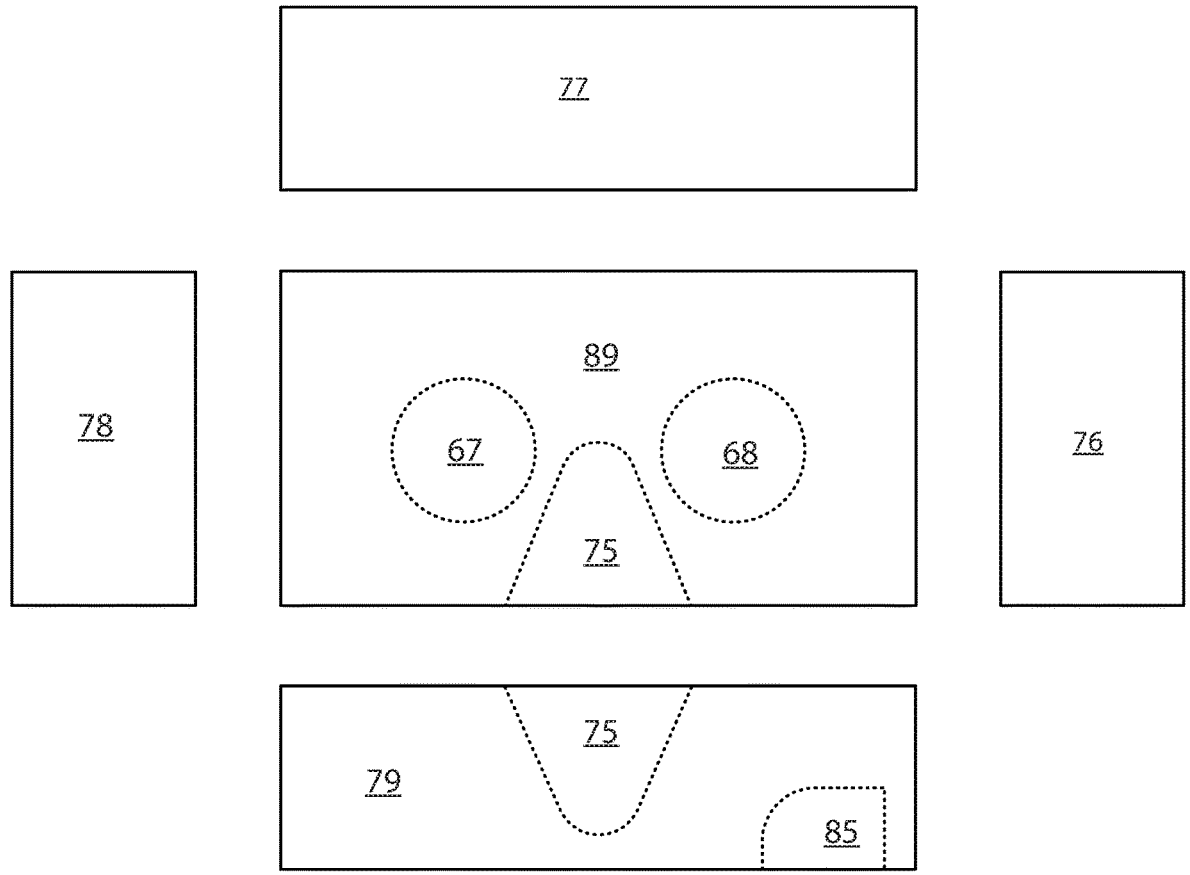
FIG. 68 is the top, bottom, front, and side elevations of the inside frame of the twenty-seventh preferred embodiment of the present invention.
Figure 69:
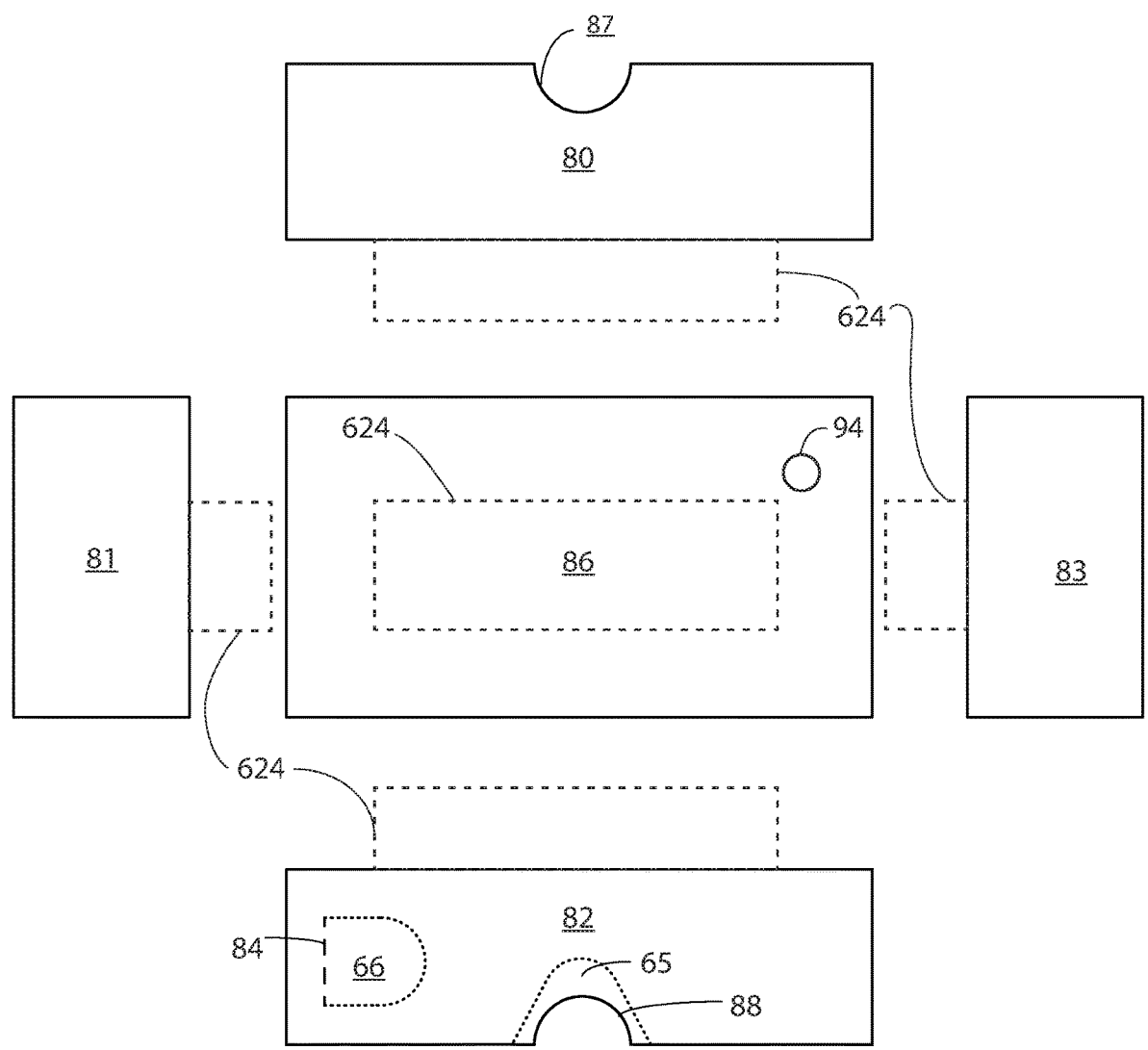
FIG. 69 is the top, bottom, front, and side elevations of the outer frame of the twenty-seventh preferred embodiment of the present invention with the haptic device attached.

As depicted in FIGS. 68 and 69, the inner lid (54) is assembled by any conventional attachment means, such as taping the edges of panels (76-79, 89) together and panels (80-83, 86) together for the outer lid (90) assembly. Slots (66) defined by crease (84) and slot (85) provide the user access to the screen of the device (61). Notches (87, 88) on outer lid (90) make it easier to separate from inner lid.

The general process of use of the present invention, as depicted in FIG. 1, is preferably as follows:

1. The user acquires the present invention via purchase from a retailer or is bundled together as a box for a product, such as a phone, computer, pizza box, etc. The box is unfolded to a planar surface. (1000)
2. The user detaches all perforated areas from the planar surface. (1100)
3. The pair of biconvex lenses (47, 49) are attached to the face plate (1200)
4. Creases are folded and secured within slots of the panels via interlocking tongue and slots, forming the viewer housing. (1300)
5. The user secures his or her smart device (61) within the viewer housing to the back plate (3) via adhesive, suction, elastic/rubber band, or similar conventional attachment mechanism. (1400)
6. For hands-free use, the user may opt to attach the viewer housing to headgear such as a hat via elastic. (1500)
7. Optionally, the user may also opt to connect a haptic feedback device or controller to the smart device (61) and/or viewer housing. (1600)

It should be understood that the perforations of the present invention, while delineated, maintain enough tensile strength so as to not becoming detached when fed through a printer or placed into a copier. Such tensile strength ensures that the material of the present invention may be printed on with a pattern, face, character, or other features.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A method for the construction of a virtual-reality viewer for use with a smart device from a planar panel derived from a packaging box by a user comprising:
the user unfolding the packaging box revealing the planar panel;
wherein the planar panel is delineated by perforations indicating a cutout;
the user detaching the perforations, removing the cutout from the planar panel;
the user detaching two identical, symmetrical circles from the cutout as indicated on the cutout, leaving two identical holes;
the user attaching a pair of biconvex lenses to a rear of the cutout, over said two identical holes via tabs;
folding flaps to form a series of creases;
securing the series of creases within slots as indicated on the cutout, forming a viewer housing;
wherein the viewer housing includes a face plate, a back plate, and a spine;
the user placing the smart device within the viewer housing;
wherein the spine and the back plate are configured to hold the smart device between the spine and the back plate;
the user securing the smart device to the back plate of the viewer housing with at least one rubber band; and
wherein the back plate of the viewer housing is erected with multiple folds of side panels, increasing the stability of the viewer housing when the smart device is secured to the back plate.

2. The method of claim 1, further comprising:
the user attaching a head strap to a right side and a left side of the viewer housing; and
wherein the back plate is shaped to resemble features of a face/character.

3. The method of claim 2, further comprising:
the user attaching a haptic feedback device to a front of the back plate of the viewer housing.

4. The method of claim 1, further comprising:
the user attaching a haptic feedback device to a front of the back plate of the viewer housing.

5. The method of claim 1, wherein said planar panel is sufficiently strong along perforations of said perforated cutouts so that said planar panel can be fed through a printer without said perforated cutouts separating from said planar panel.

6. A foldable convertible virtual reality viewer device for viewing a three-dimensional environment for use with a smart phone comprising:
a planar panel;
a perforated cutout within said planar panel, said perforated cutout configured to be removed from said planar panel;
folding panels;
flaps;
wherein said folding panels are delineated with pre-formed creases;
wherein said flaps are delineated with pre-formed creases;
slots, said slots configured to receive said flaps;
wherein folding of said folding panels and placement of said flaps within said slots erects a viewer housing, said viewer housing comprising: a face plate, a spine/frame, and a back plate;
wherein said back plate is reinforced by multiple folds of said folding panels;
wherein said spine/frame is disposed centrally between said face plate and said back plate;
wherein said spine/frame is perpendicular to said face plate and said back plate;
lens cutouts, said lens cutouts disposed within said face plate;
a pair of biconvex lenses, said pair of biconvex lenses attached to a rear of said face plate via tabs;
wherein said pair of biconvex lenses are aligned with said lens cutouts;
wherein said pair of biconvex lenses are connected as a unitary piece;
wherein said pair of biconvex lenses are oriented such that the sides of lesser curvature are facing away from the smart phone;
a nose cut-out, said nose cutout disposed at a bottom of said face plate;
wherein said spine/frame and said back plate are configured to hold the smart phone between said spine/frame and said back plate;
at least one rubber band, said at least one rubber band disposed on said back plate; and
wherein said at least one rubber band secures the smart phone to said back plate.

7. The device of claim 6, wherein said lens cutouts are shaped like eyebrows.

8. The device of claim 6, wherein said lens cutouts are shaped to resemble features of a face/character brand logo.

9. The device of claim 6, wherein said planar panel is shaped to resemble features of a face/character brand logo.

10. The device of claim 6, wherein said planar panel is sufficiently strong along perforations of said perforated cutouts so that said planar panel can be fed through a printer without said perforated cutouts separating from said planar panel.

* * * * *